(12) United States Patent
Suzuki et al.

(10) Patent No.: US 12,453,208 B2
(45) Date of Patent: Oct. 21, 2025

(54) LIGHT DETECTING DEVICE AND METHOD FOR CONTROLLING LIGHT DETECTING DEVICE

(71) Applicant: HAMAMATSU PHOTONICS K.K., Hamamatsu (JP)

(72) Inventors: Kenta Suzuki, Hamamatsu (JP); Katsuya Ishikawa, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 108 days.

(21) Appl. No.: 18/287,072

(22) PCT Filed: Mar. 10, 2022

(86) PCT No.: PCT/JP2022/010694
§ 371 (c)(1),
(2) Date: Oct. 16, 2023

(87) PCT Pub. No.: WO2023/286346
PCT Pub. Date: Jan. 19, 2023

(65) Prior Publication Data
US 2024/0204119 A1 Jun. 20, 2024

(30) Foreign Application Priority Data
Jul. 13, 2021 (JP) .................. 2021-115559

(51) Int. Cl.
*H10F 77/60* (2025.01)
*A61B 6/00* (2024.01)
(Continued)

(52) U.S. Cl.
CPC .......... *H10F 77/60* (2025.01); *A61B 6/4488* (2013.01); *G01T 1/20188* (2020.05); *G01T 1/244* (2013.01); *H10F 77/95* (2025.01)

(58) Field of Classification Search
CPC .... G01T 1/20188; G01T 1/244; A61B 6/4488
See application file for complete search history.

(56) References Cited

U.S. PATENT DOCUMENTS

| | | | | |
|---|---|---|---|---|
| 2010/0054419 | A1* | 3/2010 | Watanabe | A61B 6/00 378/114 |
| 2011/0199523 | A1* | 8/2011 | Tanabe | H04N 25/30 348/311 |
| 2022/0071057 | A1* | 3/2022 | Konkle | A61B 6/4488 |

FOREIGN PATENT DOCUMENTS

| | | | | |
|---|---|---|---|---|
| CN | 116263152 A | * | 6/2023 | .............. F04B 49/20 |
| JP | 2000-187078 A | | 7/2000 | |

(Continued)

OTHER PUBLICATIONS

International Preliminary Report on Patentability mailed Jan. 25, 2024 for PCT/JP2022/010694.

*Primary Examiner* — Casey Bryant
(74) *Attorney, Agent, or Firm* — Faegre Drinker Biddle & Reath LLP

(57) ABSTRACT

A light detecting device includes: a light detector; a heat exchanger thermally connected to the light detector; a coolant flow channel configured to be connected to the heat exchanger and allow a coolant for cooling the light detector to flow; a pump configured to cause the coolant to flow in the coolant flow channel; and a control unit that controls the pump. The control unit performs control such that a first drive power is supplied to the pump during a detection period in which the light detector performs light detection, and a second drive power is supplied to the pump during a standby period in which the light detector stands by without performing light detection, and the first drive power is smaller than the second drive power.

12 Claims, 9 Drawing Sheets

(51) Int. Cl.
   *G01T 1/20* (2006.01)
   *G01T 1/24* (2006.01)
   *H10F 77/00* (2025.01)

(56) References Cited

FOREIGN PATENT DOCUMENTS

| JP | 2005-064186 A | 3/2005 |
| JP | 2007-279721 A | 10/2007 |
| JP | 2012-163612 A | 8/2012 |
| JP | 2014-052660 A | 3/2014 |
| JP | 2017-191756 A | 10/2017 |
| JP | 6680653 B2 | 4/2020 |

* cited by examiner

LIGHT DETECTING DEVICE AND METHOD FOR CONTROLLING LIGHT DETECTING DEVICE

TECHNICAL FIELD

The present disclosure relates to a light detecting device and a method for controlling the light detecting device.

BACKGROUND ART

In the field of light detecting devices, when light detection is performed by a light detector, dark current due to thermal electrons tends to increase with an increase in temperature of the light detector. When the dark current increases as described above, the S/N ratio of the light detector decreases, and thus, there is a possibility of deterioration in detection accuracy of the light detecting device such as a decrease in reliability of a detection signal from the light detector, for example. Hence, it is important to cool the light detector to reduce influences of thermal electrons in order to improve the detection accuracy of a light detecting device. For example, Patent Literature 1 discloses a liquid-cooling type cooling mechanism capable of cooling a light detector by circulation of a coolant. In this liquid-cooling type cooling mechanism, the light detector can be cooled by exchanging heat between the light detector and the coolant circulating by driving of a pump.

CITATION LIST

Patent Literature

Patent Literature 1: Japanese Unexamined Patent Publication No. 2014-052660

SUMMARY OF INVENTION

Technical Problem

However, in the liquid-cooling type cooling mechanism as described above, pulsation occurs in the flow of the coolant when the pump performs an operation of delivering the coolant, and vibration derived from the pulsation can be transmitted to the light detector, a measurement apparatus using the light detecting device, and the like. In this case, there is a possibility that detection conditions such as a sample position and a light condensing position may change during a detection period in which the light detector performs light detection. As a result, detection accuracy of the light detecting device may deteriorate.

The present disclosure provides a light detecting device and a method for controlling the light detecting device that can suppress deterioration in detection accuracy.

Solution to Problem

A light detecting device according to an embodiment of the present disclosure includes: a light detector; a heat exchanger thermally connected to the light detector; a coolant flow channel configured to be connected to the heat exchanger and allow a coolant for cooling the light detector to flow; a pump configured to cause the coolant flow in the coolant flow channel; and a control unit that controls the pump. The control unit performs control such that a first drive power is supplied to the pump during a detection period in which the light detector performs light detection, and a second drive power is supplied to the pump during a standby period in which the light detector stands by without performing light detection, and the first drive power is smaller than the second drive power.

In the light detecting device, the coolant delivered by the pump and reaching the heat exchanger exchanges heat with the light detector via the heat exchanger to cool the light detector. Here, the first drive power supplied to the pump during the detection period is smaller than the second drive power supplied to the pump during the standby period. Therefore, during the detection period, an operation of the pump is reduced when delivering the coolant. Accordingly, vibration caused by pulsation that may occur in the flow of the coolant also decreases. As a result, it is possible to suppress deterioration in detection accuracy of the light detecting device due to transmission of vibration derived from pulsation. Further, a magnitude of the heat capacity of the coolant itself can be used by using the coolant. Therefore, even when the operation of the pump is reduced during the detection period, heat from the heat exchanger can be absorbed using the heat capacity of the coolant itself. Therefore, it is possible to maintain a cooling effect of the light detector by the coolant even during the detection period, and it is possible to suppress deterioration in detection accuracy of the light detecting device due to an increase in temperature of the light detector. Hence, it is possible to suppress deterioration in detection accuracy according to the light detecting device described above.

In the light detecting device described above, the control unit may control to stop supplying the first drive power during the detection period. In this case, since the operation of the pump is stopped during the detection period, the vibration derived from the pulsation described above can be more reliably suppressed. Consequently, it is possible to more reliably suppress deterioration in detection accuracy of the light detecting device due to transmission of the vibration derived from the pulsation.

In the light detecting device described above, the control unit may perform control such that the first drive power is larger than zero and smaller than the second drive power during the detection period. In this case, since the operation of the pump is continued during the detection period, it is possible to suppress a reduction in cooling effect of the light detector by the coolant. That is, an increase in temperature of the light detector during the detection period can be suppressed. Hence, it is possible to suppress the transmission of the vibration derived from the pulsation while suppressing the increase in temperature of the light detector according to the configuration described above. As a result, it is possible to more reliably suppress deterioration in detection accuracy of the light detecting device.

The light detecting device described above may further include an electronic cooler thermally connected to the light detector and the heat exchanger. In this case, since the light detector can be efficiently cooled by the electronic cooler, the increase in temperature of the light detector can be more reliably suppressed. As a result, it is possible to more reliably suppress deterioration in detection accuracy of the light detecting device.

In the light detecting device described above, the control unit may perform control such that a third drive power is supplied to the electronic cooler during the detection period. In this case, the control unit can cool the light detector by controlling the electronic cooler to be driven even during the detection period. On the other hand, although heat is generated by driving the electronic cooler, the heat is transferred to the heat exchanger and then dissipates to the coolant. As described above, since the magnitude of the heat capacity of the coolant itself can be used, the cooling effect of the light detector by the coolant can be maintained. Hence, according to the configuration described above, it is possible to more reliably suppress the increase in temperature of the light detector while suppressing the transmission of the vibration derived from the pulsation by cooling the light detector by the electronic cooler and the coolant. As a result, it is possible to more reliably suppress deterioration in detection accuracy of the light detecting device.

The light detecting device described above may further include at least one of a first sensor configured to detect a temperature of the light detector and a second sensor configured to detect a temperature of the heat exchanger. In this case, it is possible to sense an undesired increase in temperature in the light detecting device by detecting the temperature of at least one of the light detector and the heat exchanger.

The light detecting device described above may further include at least a first sensor that detects a temperature of the light detector, in which the control unit may control supply of the third drive power to the electronic cooler such that the temperature detected by the first sensor is equal to or lower than a first allowable temperature during the detection period. In this case, it is possible to suppress an undesired increase in temperature in the light detecting device by supplying the third drive power according to the temperature of the light detector.

In the light detecting device described above, the control unit may perform control such that the third drive power at a time t1 is larger than the third drive power at a time t2 before the time t1 during the detection period. During the detection period, since the drive power of the pump is small, the temperature of the light detector may gradually increase. In this respect, the cooling effect of the light detector by the electronic cooler can be enhanced by controlling the third drive power to be larger at the time t1 after the time t2. Consequently, it is possible to suppress a situation in which the temperature of the light detector increases. As a result, it is possible to more reliably suppress deterioration in detection accuracy of the light detecting device due to an increase in temperature of the light detector.

The light detecting device described above may further include a fan that blows air toward the coolant flow channel, in which the control unit may perform control such that a fourth drive power is supplied to the fan during the detection period, and a fifth drive power is supplied to the fan during the standby period, and the fourth drive power is smaller or larger than the fifth drive power. In this case, since the coolant is cooled by the fan blowing air to the coolant flow channel, it is possible to enhance the cooling effect of the light detector by the coolant. In such a mechanism including the fan, vibration of the fan itself is transmitted to the light detecting device, and thereby the detection accuracy of the light detecting device may deteriorate. In this respect, it is possible to suppress deterioration in detection accuracy of the light detecting device due to transmission of the vibration of the fan by causing the fourth drive power supplied to the fan during the detection period to be smaller than the fifth drive power supplied to the fan during the standby period. In a case where the fan is sufficiently separated from the light detector, the fourth drive power supplied to the fan during the detection period is caused to be larger than the fifth drive power supplied to the fan during the standby period, and thereby heat dissipation efficiency of the coolant in the coolant flow channel can be enhanced, and deterioration in detection accuracy of the light detecting device due to an increase in temperature of the light detector can be suppressed.

In the light detecting device described above, the coolant flow channel may further include a radiator that releases heat of the coolant, and the fan may blow air toward the radiator. In this case, the coolant is cooled by the radiator and the fan so that the cooling effect of the light detector by the coolant can be further enhanced.

The light detecting device described above may further include at least a second sensor that detects a temperature of the heat exchanger, in which the control unit may perform control such that a sixth drive power is supplied to the pump and the sixth drive power is larger than the first drive power in a case where the temperature detected by the second sensor exceeds a second allowable temperature during the detection period. An increase in temperature of the light detector leads to an increase in dark current value. Accordingly, the heat exchanger is likely to have a high temperature because heat of the light detector is transferred thereto. In this respect, when the temperature of the heat exchanger exceeds the second allowable temperature, the sixth drive power larger than the first drive power is supplied to the pump, and thereby it is possible to suppress an increase in dark current value and a situation in which the heat exchanger has a high temperature. As a result, it is possible to suppress an undesired increase in temperature in the light detecting device.

According to an embodiment of the present disclosure, there is provided a method for controlling a light detecting device including a light detector, a heat exchanger thermally connected to the light detector, a coolant flow channel configured to be connected to the heat exchanger and allow a coolant for cooling the light detector to flow, and a pump configured to cause the coolant to flow in the coolant flow channel. The method for controlling a light detecting device includes: a step of supplying a first drive power to the pump during a detection period in which the light detector performs light detection; and a step of supplying a second drive power to the pump during a standby period in which the light detector stands by without performing light detection. The first drive power is smaller than the second drive power.

In the method for controlling the light detecting device, the first drive power supplied to the pump during the detection period is smaller than the second drive power supplied to the pump during the detection period. Therefore, during the detection period, an operation of the pump is reduced when delivering the coolant. Accordingly, vibration caused by pulsation that may occur in the flow of the coolant also decreases. As a result, it is possible to suppress deterioration in detection accuracy of the light detecting device due to transmission of vibration derived from pulsation. Further, by using the coolant, a magnitude of the heat capacity of the coolant itself can be used. Therefore, even when the operation of the pump is reduced during the detection period, heat from the heat exchanger can be absorbed using the heat capacity of the coolant itself. Therefore, it is possible to maintain a cooling effect of the light detector by the coolant even during the detection period, and it is possible to suppress deterioration in detection accuracy of the light detecting device due to an increase in temperature of the light detector. Hence, it is possible to suppress deterioration in detection accuracy according to the method for controlling a light detecting device described above.

Advantageous Effects of Invention

According to the present disclosure, there are provided a light detecting device and a method for controlling the light detecting device that can suppress deterioration in detection accuracy.

DESCRIPTION OF EMBODIMENTS

Figure 1:
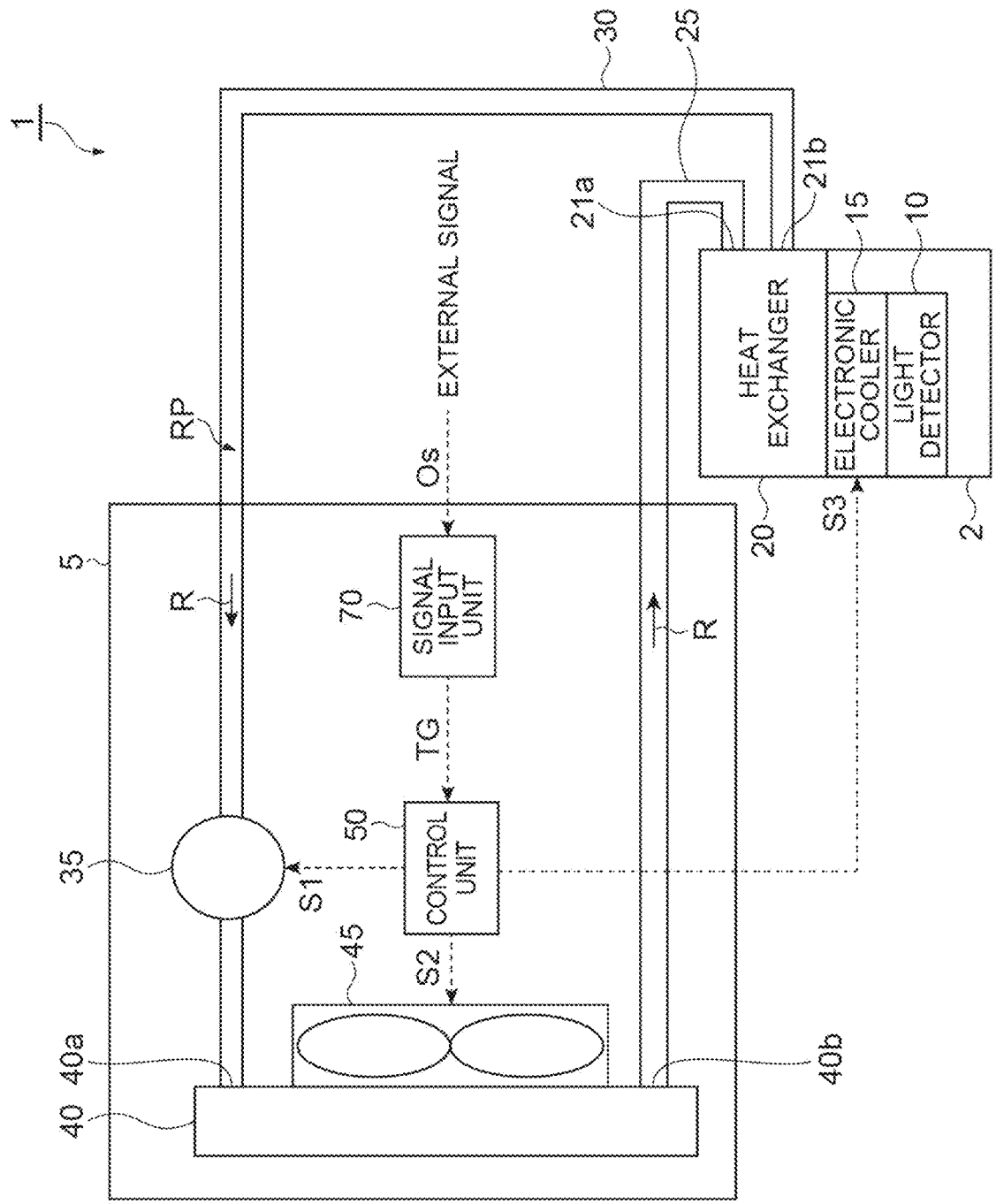
FIG. 1 is a schematic configuration diagram illustrating a light detecting device according to an embodiment.

Hereinafter, a light detecting device and a method for controlling the light detecting device according to an embodiment of the present disclosure will be described in detail with reference to the drawings. In the following description, the same or equivalent elements are denoted by the same reference numerals, and redundant description thereof will be omitted as appropriate.

FIG. 1 is a schematic configuration diagram illustrating a light detecting device 1 according to the embodiment. The light detecting device 1 is used, for example, in a detection unit of a measurement apparatus such as a microscope apparatus or an analysis apparatus. The light detecting device 1 includes a light detector 10 that detects light L (hereinafter, referred to as "measurement light L") that is a measurement target. Further, the light detecting device 1 includes, as a cooling mechanism for cooling the light detector 10, an electronic cooler 15, a heat exchanger 20, a first tube 25, a second tube 30, a pump 35, a radiator 40, a fan 45, and a control unit 50.

Figure 2:
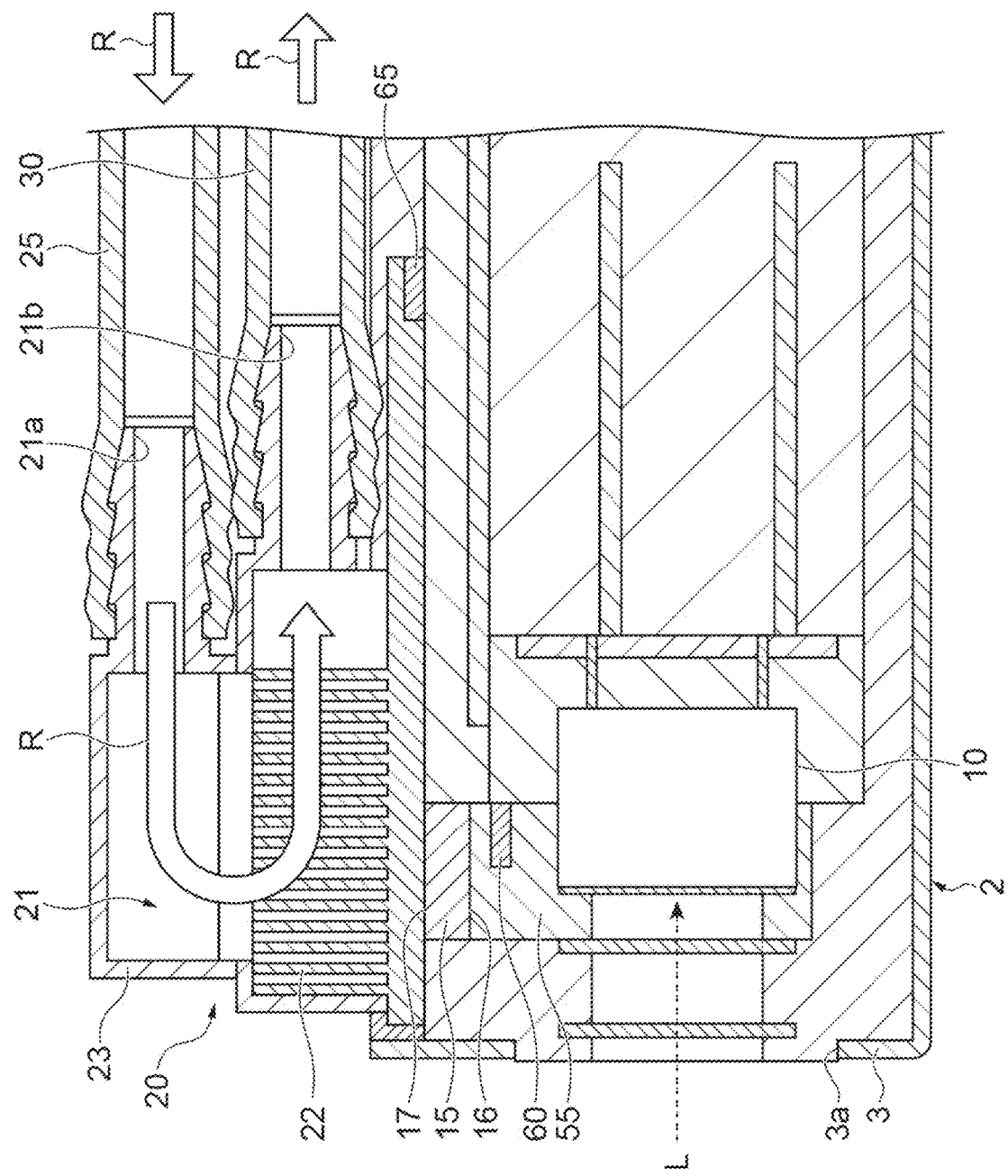
FIG. 2 is a cross-sectional view illustrating a configuration in the vicinity of a light detector illustrated in FIG. 1.

FIG. 2 is a cross-sectional view illustrating a configuration in the vicinity of the light detector 10. As illustrated in FIG. 2, the light detector 10 is accommodated in a case 2. The case 2 is, for example, formed in a box shape opening upward and is made of a metal material. A side wall 3 of the case 2 has an opening 3a formed to enable measurement light L to be introduced into the case 2. The light detector 10 detects the light intensity of the measurement light L introduced from the opening 3a and generates an electric signal corresponding to the light intensity. The light detector 10 transmits the generated electric signal, for example, to a measurement apparatus such as a microscope apparatus or an analysis apparatus. The light detector 10 is, for example, a photomultiplier tube (PMT). The light detector 10 may be an optical semiconductor element such as an avalanche photo diode (APD) or silicon photomultipliers (SiPM).

The electronic cooler 15 is disposed on the light detector 10 in the case 2. The electronic cooler 15 is provided to cool the light detector 10. The electronic cooler 15 is an active cooling element and is, for example, a Peltier element that performs cooling or heating using a phenomenon (Peltier effect) in which heat moves when electricity flows. The electronic cooler 15 is driven to absorb heat at a heat absorption surface 16 formed toward the light detector 10 and cause heat dissipation at a heat dissipation surface 17 formed toward the side opposite to the heat absorption surface 16. The light detector 10 can be cooled to a temperature below the freezing point (that is, a temperature lower than that of a coolant R) via the heat absorption surface 16 by the heat transfer by the electronic cooler 15. Drive of the electronic cooler 15 is controlled by the control unit 50 (see FIG. 1). The heat absorption surface 16 is connected to the light detector 10 via a heat transfer portion 55. The heat transfer portion 55 is a member having thermal conductivity and enables heat to be transferred from the light detector 10 to the heat absorption surface 16.

Hence, the heat absorption surface 16 enters into a thermally connected state to the light detector 10. In the present specification, the "thermally connected state" means a state in which two members are directly or indirectly connected to each other and heat can be transferred (heat transfer) between the two members. Hence, the connection between the heat absorption surface 16 and the light detector 10 may be any connection as long as thermal connection is realized, and physically, the connection may be an indirect connection via another member such as the heat transfer portion 55 or a direct connection without another member therebetween. The heat absorption surface 16 and the light detector 10 may be connected by performing bonding using an adhesive material or a sheet material having a high thermal conductivity from the viewpoint of suppressing thermal resistance.

The heat exchanger 20 is disposed on the heat dissipation surface 17 of the electronic cooler 15. The heat dissipation surface 17 is thermally connected to the heat exchanger 20. Hence, the heat transmitted from the heat absorption surface 16 to the heat dissipation surface 17 is transferred to the heat exchanger 20. The heat dissipation surface 17 and the heat exchanger 20 may be connected by performing bonding using an adhesive material or a sheet material having a high thermal conductivity from the viewpoint of suppressing thermal resistance.

The heat exchanger 20 is disposed, for example, to block an upper opening portion of the case 2. The heat exchanger 20 includes, for example, a flow channel 21, a heat sink 22, and a housing 23 that accommodates them. The flow channel 21 is a space in the housing 23 and is formed to have a U shape in the cross section illustrated in FIG. 2. In the housing 23, the first tube 25 is connected to a projecting portion constituting an inlet 21a of the flow channel 21. The second tube 30 is connected to a projecting portion constituting an outlet 21b of the flow channel 21. The heat sink 22 is disposed in the flow channel 21. The coolant R flows from the first tube 25 through the inlet 21a into the flow channel 21. The coolant R is a cooling medium (for example, water or the like) for cooling the light detector 10. The coolant R flowing into the flow channel 21 passes between comb-shaped fins of the heat sink 22 and flows from the outlet 21b into the second tube 30. When the coolant R passes through the heat sink 22, heat exchange is performed between the heat sink 22 and the coolant R so that the heat released from the heat dissipation surface 17 of the electronic cooler 15 is transferred to the coolant R. In this manner, heat exchange is performed between the light detector 10 and the coolant R via the electronic cooler 15 and the heat sink 22, and thereby the light detector 10 is cooled.

As illustrated in FIG. 2, the light detecting device 1 further includes a first sensor 60 and a second sensor 65. The first sensor 60 is a temperature sensor that detects a temperature of the light detector 10. The first sensor 60 is installed, for example, on the light detector 10 in the case 2. More specifically, the first sensor 60 is installed in the heat transfer portion 55 thermally connected to the light detector 10. The first sensor 60 detects a temperature of the light detector 10 and outputs a signal H1 (see FIG. 3) indicating a detected temperature of the light detector 10 to the control unit 50. The second sensor 65 is a temperature sensor that detects a temperature of the heat exchanger 20. The second sensor 65 is thermally connected to, for example, the heat sink 22. The second sensor 65 detects a temperature of the heat exchanger 20 and outputs a signal H2 (see FIG. 3) indicating a detected temperature of the heat exchanger 20 to the control unit 50.

The following description is provided with reference to FIG. 1 again. The second tube 30 connected to the outlet 21b of the heat exchanger 20 is connected to an inlet 40a of a flow channel in the radiator 40 disposed at a position separated from the heat exchanger 20. A pump 35 is provided at a position on the second tube 30. On the other hand, the first tube 25 connected to the inlet 21a of the heat exchanger 20 is connected to an outlet 40b of the flow channel in the radiator 40. Hence, the coolant R flowing from the outlet 21b of the heat exchanger 20 into the second tube 30 flows into the inlet 40a of the radiator 40 via the pump 35. The coolant R flowing from the outlet 40b of the radiator 40 into the first tube 25 flows into the heat exchanger 20 again from the inlet 21a.

Thus, the flow channel 21 (see FIG. 2) of the heat exchanger 20, the first tube 25, the radiator 40, and the second tube 30 constitute a closed circulation channel RP (coolant flow channel) that enables the coolant R to circulate (flow) between the radiator 40 and the heat exchanger 20. The first tube 25 and the second tube 30 may be, for example, a soft tube made of a material having flexibility such as butyl rubber or a hard tube made of a material that does not have flexibility.

In the circulation channel RP, the pump 35 delivers the coolant R in one direction so that the coolant R circulates in a direction of arrows illustrated in FIG. 1. A type of pump 35 is not particularly limited. As the pump 35, for example, a known pump capable of generating pulsation, such as a diaphragm pump, can be employed. Drive of the pump 35 is controlled by the control unit 50. The radiator 40 causes heat dissipation of the coolant R through heat exchange between the coolant R flowing in the flow channel of the radiator 40 and outside air. In this manner, the radiator 40 cools and lowers the temperature of the coolant R through dissipation of heat received by the coolant R in the heat exchanger 20.

The fan 45 is disposed to blow air toward the radiator 40. The fan 45 cools the coolant R by blowing air toward the flow channel of the radiator 40. Drive of the fan 45 is controlled by the control unit 50. The coolant R cooled by the radiator 40 and the fan 45 again flows into the heat exchanger 20 and exchanges heat with the heat exchanger 20 (more specifically, the heat sink 22). The pump 35, the radiator 40, and the fan 45 are accommodated, for example, in a case 5 other than the case 2 accommodating the light detector 10. The case 5 is connected to the case 2 by the first tube 25 and the second tube 30. The case 5 is disposed at a position separated from the case 2.

As described above, the coolant R continues cooling the light detector 10 via the heat exchanger 20 while circulating between the heat exchanger 20 and the radiator 40 in the circulation channel RP. Specifically, the coolant R cools the light detector 10 by heat exchange with the heat exchanger 20 and causes dissipation of the heat received by the heat exchange in the radiator 40. Thereafter, the cooled coolant R returns to the heat exchanger 20 again to cool the light detector 10 again.

The control unit 50 is, for example, an electronic control unit such as a microcomputer including a memory such as a RAM or a ROM, a processor (arithmetic circuit) such as a CPU, a communication interface, and a storage unit such as a storage element such as an EPROM or a flash memory. The control unit 50 functions by executing a program stored in a memory by a processor. The control unit 50 is accommodated in the case 5 together with, for example, the pump 35, the radiator 40, and the fan 45. The control unit 50 is electrically connected to a power source, and power is supplied from the power source to the control unit 50. The control unit 50 is electrically connected to the pump 35, the fan 45, and the electronic cooler 15, and the power of the power source is supplied to the pump 35, the fan 45, and the electronic cooler 15 via the control unit 50. The power of the power source is not limited to the case of being supplied via the control unit 50. For example, a signal from the control unit 50 may be input to the power source, and a drive power based on the signal may be directly supplied from the power source to the pump 35, the fan 45, and the electronic cooler 15. The power source may be a battery mounted in the case 5 or may be externally supplied by an AC adapter or the like.

Figure 3:
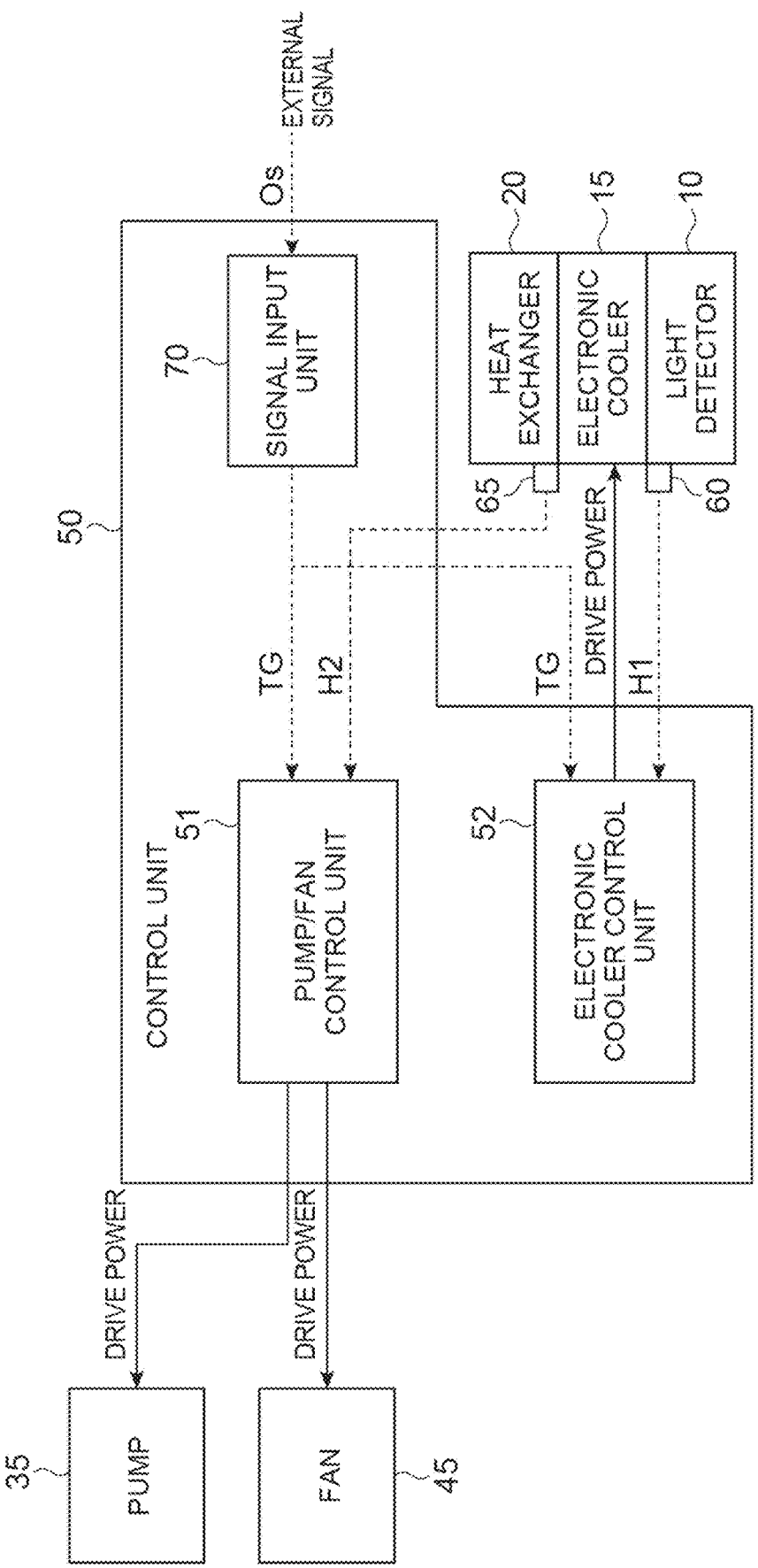
FIG. 3 is a block diagram illustrating a functional configuration of a control unit illustrated in FIG. 1.

The signal H1 from the first sensor 60 and the signal H2 from the second sensor 65 are input to the control unit 50 (see FIG. 3). Further, the control unit 50 includes, for example, a signal input unit 70 that receives an external signal Os indicating a timing at which the light detector 10 performs detection from the outside (for example, a measurement apparatus such as a microscope apparatus or an analysis apparatus) of the light detecting device 1 and that outputs a trigger signal TG on the basis of the external signal Os. The external signal Os may be a complementary metal oxide semiconductor (CMOS) signal or a transistor transistor logic (TTL) signal from a logic device such as a microcomputer or a field programmable gate array (FPGA) or may be a serial signal from a personal computer. The signal input unit 70 is not limited to the reception of the external signal Os and may be an interface that receives a user's operation input. As the interface, for example, a push button, a switch, a touch panel, or the like can be employed. In this case, the signal input unit 70 outputs the trigger signal TG indicating the timing at which the light detector 10 performs detection in response to the user's operation input. The control unit 50 controls the drive of the pump 35, the fan 45, and the electronic cooler 15 on the basis of the trigger signal TG, the signal H1, and the signal H2.

Figure 4:
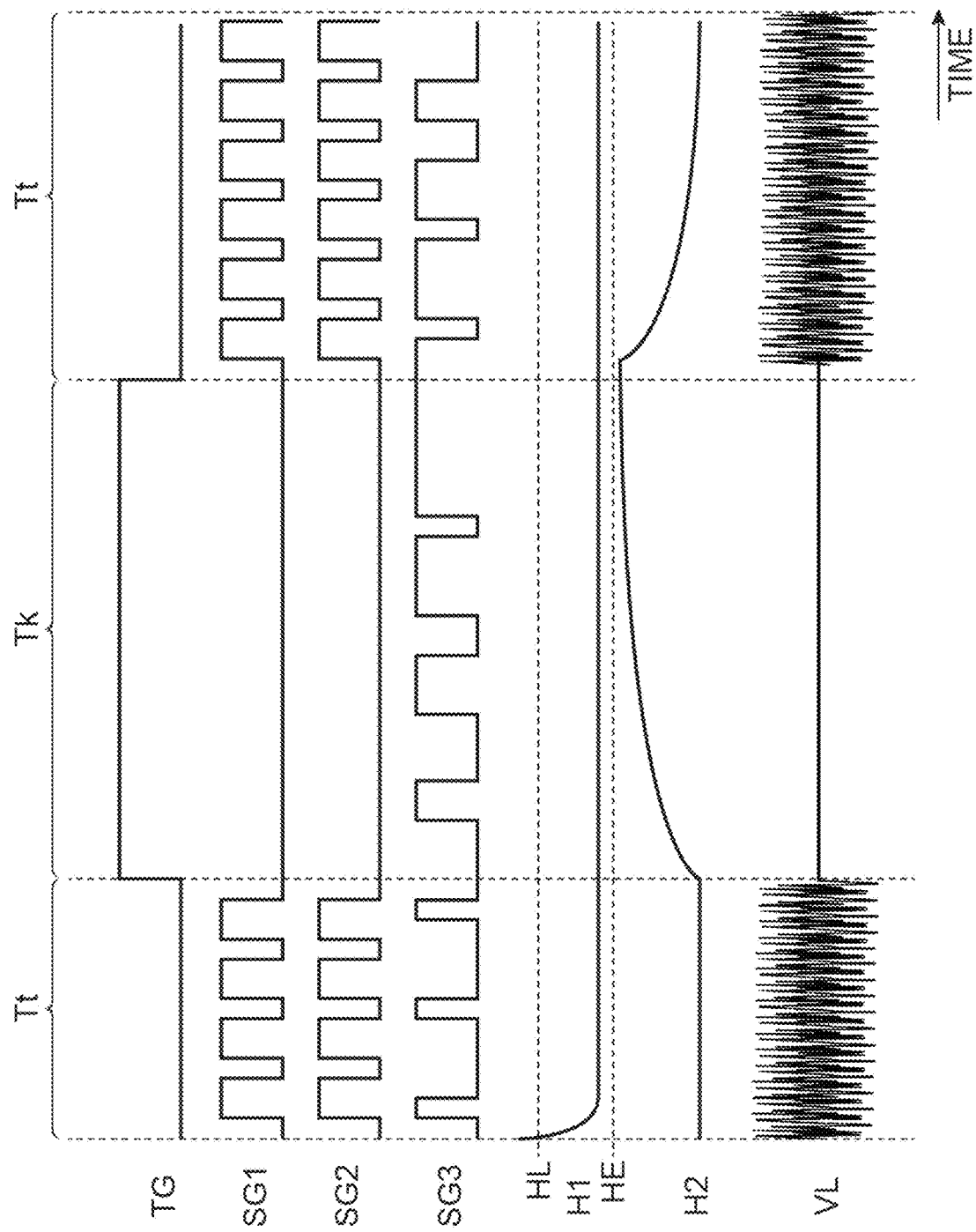
FIG. 4 is a timing chart illustrating an example of each signal processed by the control unit.

FIG. 3 is a block configuration diagram illustrating a functional configuration of the control unit 50. FIG. 4 is a timing chart illustrating an example of each signal processed by the control unit 50. As illustrated in FIG. 3, the control unit 50 includes, as functional configurations, a pump/fan controller 51 (hereinafter, referred to as the "PF controller 51") that controls the drive of the pump 35 and the fan 45 and an electronic cooler controller 52 (hereinafter, referred to as the "EC controller 52") that controls drive of the electronic cooler 15. The trigger signal TG from the signal input unit 70 is input to the PF controller 51 and the EC controller 52.

As illustrated in FIG. 4, the trigger signal TG is a pulse signal including a high-level state (ON state) and a low-level state (OFF state). The trigger signal TG enters into the ON state during a detection period Tk in which the light detector 10 performs light detection. The trigger signal TG enters into the OFF state during a standby period Tt in which the light detector 10 stands by. The detection period Tk is a period from a time point at which the light detector 10 starts the light detection to a time point at which the light detection is ended. The standby period Tt is a period excluding the detection period Tk. The standby period Tt is a period in which the light detector 10 stands by without performing the light detection. That is, the standby period Tt is a period before the time point at which the light detector 10 starts the light detection, and the standby period Tt is a period after the time point at which the light detector 10 ends the light detection.

At the time point at which the light detector 10 starts the light detection (that is, a timing of switching from the standby period Tt to the detection period Tk), the trigger signal TG switches from the OFF state to the ON state. Accordingly, at the time point at which the light detector 10 ends the light detection (that is, a timing of switching from the detection period Tk to the standby period Tt), the trigger signal TG switches from the ON state to the OFF state. The PF controller 51 and the EC controller 52 control drive of each control target according to a state of the input trigger signal TG.

The detection period Tk and the standby period Tt can be set at any duration time and timing. For example, the detection period Tk and the standby period Tt may be set to change according to a measurement target and a measurement method. The light detector 10 is not limited to continuously performing the light detection in the detection period Tk and the light detector 10 may intermittently perform the light detection a plurality of times in the detection period Tk. The control unit 50 may not include the signal input unit 70, and the detection period Tk and the standby period Tt may be set in the control unit 50 in advance.

The PF controller 51 controls the drive of the pump 35 by a drive signal SG1 and controls the drive of the fan 45 by a drive signal SG2 according to the state of the trigger signal TG. The PF controller 51 adjusts a drive power of the pump 35 by the drive signal SG1. Here, the "drive power" means a magnitude of power supplied from the power source to the pump 35. Power is represented by a product of voltage and current. Therefore, in the present specification, the "drive power" may be described in place of a "drive voltage" or may be described in place of a "driving current". In general, as the drive power of the pump 35 increases, the cooling effect of the light detector 10 by the coolant R increases. However, as the drive power of the pump 35 increases, an operation of the pump 35 when the pump 35 delivers the coolant R increases, and accordingly, vibration derived from pulsation that can be generated by the flow of the coolant R also increases. The vibration affects the detection accuracy of the light detecting device 1. On the other hand, as the drive power of the pump 35 decreases, the operation of the pump 35 when the pump 35 delivers the coolant R decreases, and the vibration derived from the pulsation also decreases. In this case, an influence of the vibration derived from the pulsation on the detection accuracy of the light detecting device 1 is reduced. However, as the drive power of the pump 35 decreases, the cooling effect of the light detector 10 by the coolant R decreases.

The drive signal SG1 is, for example, a pulse signal including a high-level state (ON state) and a low-level state (OFF state). More specifically, the drive signal SG1 is, for example, a pulse width modulation (PWM) signal (PWM control). The PWM control is a control method of controlling drive power by setting a constant cycle of ON and OFF of a pulse train from input of a constant voltage and changing an ON-time width (that is, a duty cycle). The drive signal SG1 is not limited to the PWM signal and may be an amplitude modulation (AM) signal. When the drive signal SG1 enters into the ON state, the pump 35 enters into an energized state. On the other hand, when the drive signal SG1 enters into the OFF state, the pump 35 enters into a non-energized state. The drive power of the pump 35 is determined according to a duty cycle of the drive signal SG1. Specifically, as the duty cycle of the drive signal SG1 increases, the drive power of the pump 35 increases. On the other hand, as the duty cycle of the drive signal SG1 decreases, the drive power of the pump 35 decreases.

For example, when the duty cycle of the drive signal SG1 is 0%, the pump 35 always enters into the non-energized state so that the drive power of the pump 35 is 0. In this case, the pump 35 enters into a stopped state without being driven. In a case where the duty cycle of the drive signal SG1 is 100%, the pump 35 always enters into the energized state so that the drive power of the pump 35 is equal to power suitable for driving the pump 35 at a rated output (that is, rated power). When the duty cycle of the drive signal SG1 is 50%, a time during the energized state and a time during the non-energized state are the same in a unit cycle. In this case, the drive power of the pump 35 is equal to half of the rated power. In this manner, the drive power of the pump 35 is adjusted by the duty cycle of the drive signal SG1.

The PF controller 51 adjusts the duty cycle of the drive signal SG1 according to the state of the trigger signal TG. Specifically, as illustrated in FIG. 4, the PF controller 51 controls a duty cycle of the drive signal SG1 during the detection period Tk in which the trigger signal TG enters into the ON state to be smaller than a duty cycle of the drive signal SG1 during the standby period Tt in which the trigger signal TG enters into the OFF state. That is, the PF controller 51 controls a drive power 1 (first drive power) supplied to the pump 35 during the detection period Tk to be smaller than a drive power 2 (second drive power) supplied to the pump 35 during the standby period Tt. The drive power 2 of the pump 35 during the standby period Tt is set within a range of a drive power larger than at least 0. The drive power 1 of the pump 35 during the detection period Tk is set to 0 or to be within a range of a drive power larger than 0 and smaller than the drive power 2 of the pump 35 during the standby period Tt. In the embodiment, the PF controller 51 sets the duty cycle of the drive signal SG1 during the detection period Tk to 0%. In this case, during the detection period Tk, the drive power 1 of the pump 35 becomes 0, and the drive of the pump 35 is stopped.

On the other hand, the PF controller 51 sets the duty cycle of the drive signal SG1 during the standby period Tt to, for example, 67%. In this case, during the standby period Tt, the drive power 2 of the pump 35 becomes power corresponding to 67% of the duty cycle of the drive signal SG1, and the pump 35 enters into a state of being driven to sufficiently exhibit the cooling effect of the light detector 10 by the coolant R (normal driving). The PF controller 51 drives the pump 35 with a predetermined drive power in response to the drive signal SG1. At this time, the pump 35 is driven so that the delivery amount of the coolant R becomes a predetermined delivery amount. The "delivery amount of the coolant R" by the pump 35 means a volume of the coolant R delivered by the pump 35 per unit time in the circulation channel RP. That is, the delivery amount of the coolant R is adjusted by the drive power supplied to the pump 35 in order to drive the pump 35. Hence, the "drive power of the pump 35" can be described in place of the "delivery amount of the coolant R by the pump 35".

The PF controller 51 controls the drive of the fan 45 in response to the drive signal SG2 so that an air blowing amount of the fan 45 becomes a predetermined air blowing amount. The "air blowing amount of the fan 45" means a volume of air moved per unit time by the drive of the fan 45. As the air blowing amount of the fan 45 is larger, the heat dissipation effect to the coolant R is enhanced so that the cooling effect of the light detector 10 by the coolant R is enhanced. However, as the air blowing amount of the fan 45 increases, a rotational speed of a drive unit of the fan 45 increases, and accordingly mechanical vibration of the fan 45 itself increases. The vibration affects the detection accuracy of the light detecting device 1. On the other hand, as the air blowing amount of the fan 45 decreases, the rotational speed of the drive unit of the fan 45 decreases, and the mechanical vibration of the fan 45 itself also decreases. In this case, an influence of the mechanical vibration of the fan 45 itself on the detection accuracy of the light detecting device 1 is reduced. However, as the air blowing amount of the fan 45 decreases, the heat dissipation effect to the coolant R decreases, and thus, the cooling effect of the light detector 10 by the coolant R decreases. The air blowing amount of the fan 45 is adjusted by the drive power supplied to the fan 45 in order to drive the fan 45. Hence, the "air blowing amount of the fan 45" can be described in place of the "drive power of the fan 45". Thus, as the drive power of the fan 45 increases, the mechanical vibration of the fan 45 increases. On the other hand, as the drive power of the fan 45 decreases, the mechanical vibration of the fan 45 decreases.

The PF controller 51 adjusts the drive power of the fan 45 in response to the drive signal SG2. The "drive power of the fan 45" means a magnitude of the power supplied from the power source to the fan 45. This drive power can be described in place of a drive voltage or a drive current. The drive signal SG2 is, for example, a pulse signal including a high-level state (ON state) and a low-level state (OFF state). More specifically, the drive signal SG2 is, for example, a pulse width modulation (PWM) signal (PWM control). The drive signal SG2 is not limited to the PWM signal and may be the amplitude modulation (AM) signal. When the drive signal SG2 enters into the ON state, the fan 45 enters into an energized state. On the other hand, when the drive signal SG2 enters into the OFF state, the fan 45 enters into a non-energized state. The drive power of the fan 45 is determined according to a duty cycle of the drive signal SG2. Specifically, as the duty cycle of the drive signal SG2 increases, the drive power of the fan 45 increases. On the other hand, as the duty cycle of the drive signal SG2 decreases, the drive power of the fan 45 decreases.

In the embodiment, a waveform of the drive signal SG2 is set to be the same as a waveform of the drive signal SG1 described above. Hence, similarly to the drive signal SG1, the PF controller 51 controls a duty cycle of the drive signal SG2 during the detection period Tk to be smaller than a duty cycle of the drive signal SG2 during the standby period Tt. That is, the PF controller 51 controls a drive power 4 (fourth drive power) supplied to the fan 45 during the detection period Tk to be smaller than a drive power 5 (fifth drive power) supplied to the fan 45 during the standby period Tt. The drive power 5 of the fan 45 during the standby period Tt is set within a range of a drive power larger than at least 0. The drive power 4 of the fan 45 during the detection period Tk is set to 0 or to be within a range of a drive power larger than 0 and smaller than the drive power 5 of the fan 45 during the standby period Tt. In the embodiment, the PF controller 51 sets the duty cycle of the drive signal SG2 during the detection period Tk to 0% and sets the duty cycle of the drive signal SG2 during the standby period Tt to 67%. In this case, during the detection period Tk, the drive power 4 of the fan 45 becomes 0, and the drive of the pump 35 is stopped. On the other hand, during the standby period Tt, the drive power 5 of the fan 45 becomes power corresponding to the duty cycle of 67% of the drive signal SG1, and the fan 45 enters into a state of being driven to sufficiently exhibit the cooling effect of the light detector 10 by the coolant R (normal driving).

Hence, in the embodiment, while the pump 35 and the fan 45 are normally driven during the standby period Tt, the drive of both the pump 35 and the fan 45 is stopped during the detection period Tk. In this case, during the detection period Tk, the vibration due to the drive of the pump 35 and the fan 45 can be suppressed to decrease as compared with the standby period Tt, but the cooling effect of the light detector 10 by the coolant R also decreases. However, by using the coolant R, a magnitude of the heat capacity of the coolant R itself can be used. Therefore, even when the operation of the pump 35 is reduced during the detection period Tk, heat from the heat exchanger 20 can be absorbed using the heat capacity of the coolant R itself. More specifically, for example, since the heat capacity of the coolant R is larger than that of air which is a cooling medium in a case of air cooling, a temperature of the coolant R is less likely to increase. Thus, even when the drive of the pump 35 and the fan 45 is stopped during the detection period Tk, a rapid temperature change of the light detector 10 can be suppressed so that an increase in dark current of the light detector 10 is suppressed. The dark current is a current that causes a dark signal detected by the light detector 10 in a state where the measurement light L is not incident on the light detector 10 during an operation of the light detector 10.

A cause of dark current generation can vary depending on a situation, but examples of the cause of dark current related to temperature include thermionic emission. For example, when the light detector 10 is the photomultiplier tube, thermal electrons indicate electrons emitted from a photoelectric surface or a dynode regardless of incidence of light. Such a signal derived from the thermal electrons is considered as unnecessary noise (dark) in light detection and causes deterioration in detection accuracy of the light detecting device 1. The generation of thermal electrons increases as the temperature of the light detector 10 increases, and the generation of thermal electrons decreases as the temperature of the light detector 10 decreases. Hence, when the light detector 10 is cooled, the generation of thermal electrons is suppressed, and the generation of dark current is also suppressed. On the other hand, when the temperature of the light detector 10 increases, the generation of thermal electrons increases, and the generation of dark current increases. Such a phenomenon is similar in a case where the light detector 10 is the optical semiconductor element.

In the detection period Tk, the cooling effect of the light detector 10 by the coolant R is maintained, but the cooling effect of the light detector 10 by the coolant R is smaller than that in the standby period Tt. Therefore, in the detection period Tk, the temperature of the light detector 10 may increase as time elapses. In this respect, the EC controller 52 controls the electronic cooler 15 to be driven at least in the detection period Tk. For example, the EC controller 52 continuously drives the electronic cooler 15 at least from the time point at which the light detector 10 starts the light detection to the time point at which the light detector 10 ends the light detection. Even in the detection period Tk, the light detector 10 is continuously cooled by the electronic cooler 15 as the driving of the electronic cooler 15 is continued. Consequently, it is possible to suppress an increase in temperature of the light detector 10 in the detection period Tk. In the embodiment, the EC controller 52 can lower the temperature of the light detector 10 to a temperature (for example, below the freezing point) lower than the temperature of the coolant R by continuously driving the electronic cooler 15 that actively performs cooling in the entire period including the standby period Tt and the detection period Tk. Consequently, the dark current value of the light detector 10 can be further reduced. As a result, since the detection accuracy of the light detector 10 can be improved, it is possible to suppress deterioration in detection accuracy of the light detecting device 1.

The EC controller 52 controls drive of the electronic cooler 15 in response to a drive signal SG3. Accordingly, the EC controller 52 controls the cooling capacity at the heat absorption surface 16 of the electronic cooler 15 in response to the drive signal SG3. The cooling capacity of the electronic cooler 15 is adjusted by a drive power (drive current) supplied to the electronic cooler 15 to drive the electronic cooler 15. Hence, the "cooling capacity of the electronic cooler 15" can be described in place of the "drive power of the electronic cooler 15".

The EC controller 52 adjusts the drive power of the electronic cooler 15 in response to the drive signal SG3. The "drive power of the electronic cooler 15" means a magnitude of the power supplied from the power source to the electronic cooler 15. This drive power can be described in place of a drive voltage or a drive current. The drive signal SG3 is, for example, a pulse signal including a high-level state (ON state) and a low-level state (OFF state). More specifically, the drive signal SG3 is, for example, a pulse width modulation (PWM) signal (PWM control). The drive signal SG3 is not limited to the PWM signal and may be the amplitude modulation (AM) signal. When the drive signal SG3 enters into the ON state, the electronic cooler 15 enters into an energized state. On the other hand, when the drive signal SG3 enters into the OFF state, the electronic cooler 15 enters into a non-energized state. The drive power of the electronic cooler 15 is determined according to a duty cycle of the drive signal SG3. Specifically, as the duty cycle of the drive signal SG3 increases, the drive power of the electronic cooler 15 increases. On the other hand, as the duty cycle of the drive signal SG3 decreases, the drive power of the electronic cooler 15 decreases.

The EC controller 52 sets the duty cycle of the drive signal SG3 to be always larger than 0%. That is, the EC controller 52 performs control such that power (that is, power in a range of a drive power larger than zero) suitable for driving the electronic cooler 15 is continuously supplied as a drive power 3 to the electronic cooler 15. Therefore, the electronic cooler 15 is continuously driven in the entire period including the standby period Tt and the detection period Tk. Hence, the cooling of the light detector 10 by the electronic cooler 15 is continued also in the detection period Tk. Here, since the drive of both the pump 35 and the fan 45 is stopped in the detection period Tk, there is a possibility that the temperature of the light detector 10 may increase, as time elapses, and exceed a temperature HL (first allowable temperature) in a case where the duty cycle of the drive signal SG3 is made constant (that is, in a case where the drive power of the electronic cooler 15 is made constant). The temperature HL means an upper limit value of a temperature range in which a dark current generated in the light detector 10 can be tolerated. Since a magnitude of the dark current depends on a temperature of the light detector 10, an allowable temperature range of the light detector 10 can be determined based on an allowable range of dark current values. The electronic cooler 15 is not limited to being constantly driven and may be intermittently driven as long as an allowable temperature range of the light detector 10 can be maintained.

The dark current value varies depending on the type of light detector 10 and also varies depending on an individual difference of the light detector 10. The dark current value may be a fixed value obtained with reference to the specifications of the light detector 10 or may be an actually measured value obtained by measurement of the light detector 10. When the dark current value is obtained by measurement, a current value output from the light detector 10 in a background measurement (that is, measurement in a state where the measurement light L is not incident on the light detector 10) is defined as the dark current value. The dark current value may be calculated before the light detection by the light detector 10 or may be periodically calculated at regular intervals. When the dark current value is calculated every certain period, the same dark current value may be used during the certain period.

If the temperature of the light detector 10 becomes so high as to exceed the temperature HL, the dark current excessively increases, and there is a possibility that the detection accuracy of the light detecting device 1 may be significantly affected. In this respect, the EC controller 52 monitors the temperature of the light detector 10 in response to the signal H1 from the first sensor 60 and performs feedback control on the duty cycle of the drive signal SG3 so that the temperature of the light detector 10 becomes equal to or lower than the temperature HL. The feedback control is, for example, proportional integral differential (PID) control. The feedback control may be performed by ON/OFF control.

The EC controller 52 controls the drive power 3 at a time t1 to be larger than drive power 3 at a time t2 before the time t1 in the detection period Tk by the feedback control of the drive signal SG3. In the embodiment, the EC controller 52 performs control such that a pulse width of the drive signal SG3 at the time t1 is larger than a pulse width of the drive signal SG3 at the time t2 before the time t1. In this case, in the detection period Tk, the drive power 3 of the electronic cooler 15 increases as time elapses, and the cooling effect of the light detector 10 by the electronic cooler 15 is enhanced as time elapses. By performing the feedback control of the electronic cooler 15, the EC controller 52 can maintain the temperature of the light detector 10 constant within a range of the temperature HL or less as illustrated by the signal H1 in FIG. 4. As in the embodiment, the drive power 3 at the time t1 may not be controlled to be larger than the drive power 3 at the time t2 before the time t1 by the pulse width of the drive signal SG3. For example, by continuously changing the drive signal SG3 linearly or curvilinearly, the drive power 3 at the time t1 may be controlled to be larger than the drive power 3 at the time t2 before the time t1.

In the standby period Tt, all of the pump 35, the fan 45, and the electronic cooler 15 are driven. On the other hand, in the detection period Tk, the drive of the electronic cooler 15 is continued, but the drive of both the pump 35 and the fan 45 is stopped. That is, the electronic cooler 15 is driven in a state where heat dissipation to the coolant R is not sufficiently performed. However, as described above, since the magnitude of the heat capacity of the coolant R itself can be used, heat exchange is continued between the coolant R and the heat exchanger 20, and heat dissipation of the heat sink 22 is continued. Therefore, in the detection period Tk, the temperature of the heat exchanger 20 does not increase rapidly even if the drive of the electronic cooler 15 continues. However, as illustrated by the signal H2 in FIG. 4, in the detection period Tk, the temperature of the heat exchanger 20 increases as time elapses, and there is a possibility that the temperature may eventually become very high.

In this respect, from the viewpoint of ensuring safety, the PF controller 51 monitors the temperature of the heat exchanger 20 in response to the signal H2 from the second sensor 65 at least in the detection period Tk (in the embodiment, the entire period including the standby period Tt and the detection period Tk) and drives the pump 35 and the fan 45 when the temperature of the heat exchanger 20 exceeds a temperature HE (second allowable temperature). Consequently, the PF controller 51 performs heat dissipation of the coolant R by the pump 35 and the fan 45 and restarts the heat dissipation of the heat exchanger 20 by the coolant R. The temperature HE here means an upper limit value of a temperature range of the heat exchanger 20 that can be tolerated from the viewpoint of ensuring safety. The allowable temperature range of the heat exchanger 20 from the viewpoint of ensuring safety is a temperature range in which a user can safely handle the light detecting device 1.

The PF controller 51 determines whether or not the temperature of the heat exchanger 20 exceeds the temperature HE throughout the standby period Tt and the detection period Tk. When determining that the temperature of the heat exchanger 20 does not exceed the temperature HE in the detection period Tk, the PF controller 51 causes the pump 35 and the fan 45 to enter into a stopped state. On the other hand, when determining that the temperature of the heat exchanger 20 exceeds the temperature HE, the PF controller 51 drives the pump 35 and the fan 45. The EC controller 52 may also determine whether or not the temperature of the heat exchanger 20 exceeds the temperature HE through the standby period Tt and the detection period Tk. In this case, the EC controller 52 may continue driving the electronic cooler 15 when determining that the temperature of the heat exchanger 20 does not exceed the temperature HE in the detection period Tk. On the other hand, when the EC controller 52 determines that the temperature of the heat exchanger 20 exceeds the temperature HE, the EC controller may stop driving the electronic cooler 15 or reduce the drive power 3 to suppress heat transfer from the electronic cooler 15 to the heat exchanger 20.

Figure 5:
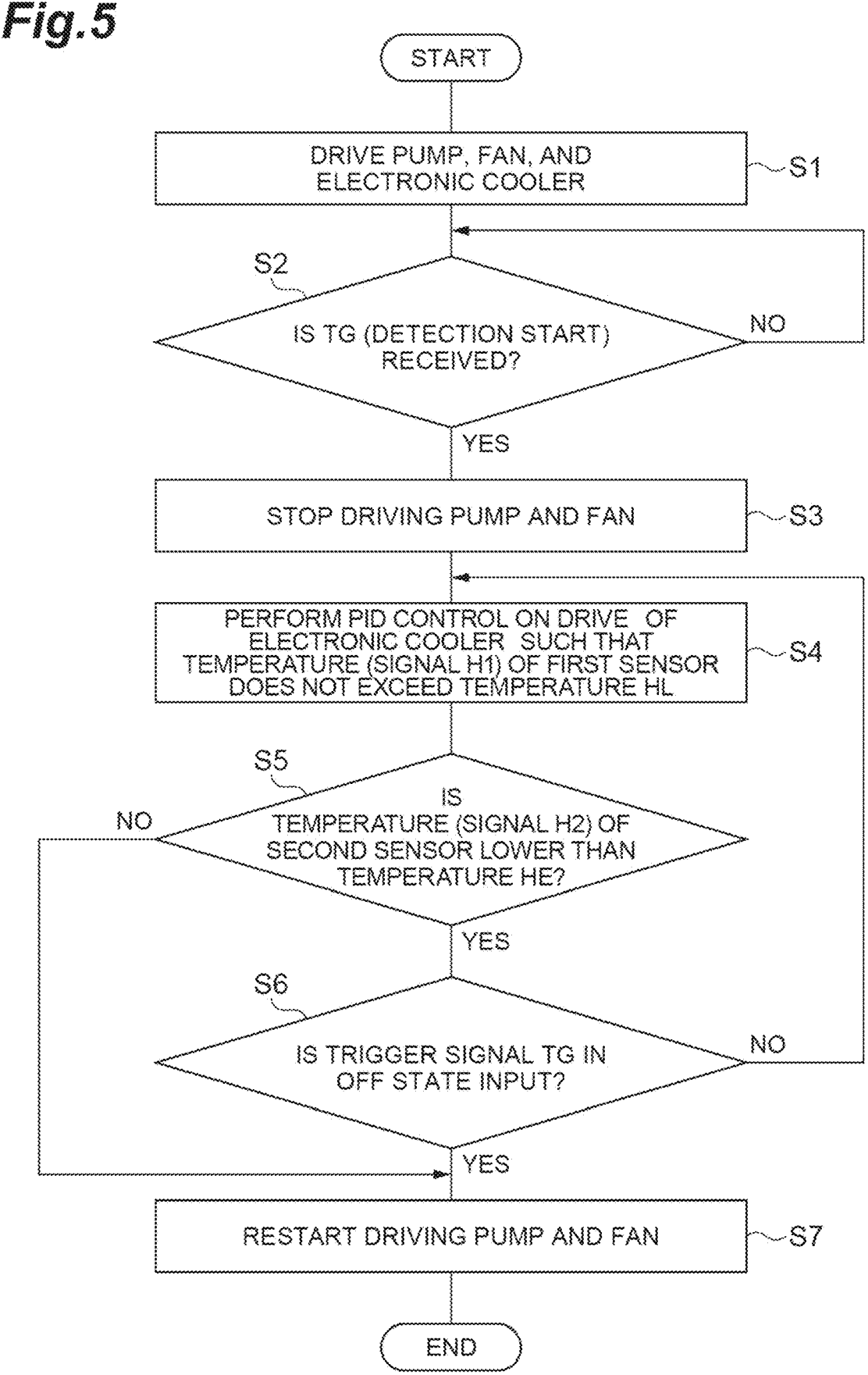
FIG. 5 is a flowchart illustrating an example of a control flow of the control unit.

Specifically, the PF controller 51 changes the drive power of the pump 35 from the drive power 1 to a drive power 6 (sixth drive power) larger than the drive power 1. The drive power 6 may be, for example, the same as the drive power 2 in the standby period Tt. The PF controller 51 changes the drive power of the fan 45 from the drive power 4 to drive power larger than the drive power 4, for example, the drive power 5 of the fan 45 in the standby period Tt. As described above, when it is determined that the temperature of the heat exchanger 20 exceeds the temperature HE, the PF controller 51 switches the pump 35 and the fan 45 from the stopped state to the normal driving state, thereby performing heat dissipation of the heat exchanger 20 so that the temperature of the heat exchanger 20 does not exceed the temperature HE. The detection period Tk may be adjusted such that the time point at which the light detector 10 ends the light detection is a time point immediately before the temperature of the heat exchanger 20 exceeds the temperature HE. In this case, the light detector 10 can perform the light detection while the pump 35 and the fan 45 are maintained in the stopped state.

subsequently, a control method of the control unit 50 will be described with further reference to FIG. 5. FIG. 5 is a flowchart illustrating a control flow of the control unit 50.

As illustrated in FIG. 5, first, in the standby period Tt, the PF controller 51 and the EC controller 52 drive the pump 35, the fan 45, and the electronic cooler 15 (Step S1). Specifically, the PF controller 51 drives the pump 35 with the drive power 2 based on the drive signal SG1 and drives the fan 45 with the drive power 5 based on the drive signal SG2. Further, the EC controller 52 drives the electronic cooler 15 with the drive power 3 based on the drive signal SG3. In the standby period Tt, the pump 35, the fan 45, and the electronic cooler 15 are all normally driven so that the cooling effect of the light detector 10 by the coolant R is sufficiently exerted.

Next, the PF controller 51 and the EC controller 52 determine whether or not the trigger signal TG in the ON state is input (Step S2). Specifically, the PF controller 51 and the EC controller 52 determine whether or not the light detector 10 has started light detection (that is, whether or not the process has been executed from the standby period Tt to the detection period Tk) by determining whether or not the trigger signal TG has been switched from the OFF state to the ON state. When the PF controller 51 and the EC controller 52 determine that the trigger signal TG in the ON state is not input (No in Step S2), the controllers continuously drive the pump 35, the fan 45, and the electronic cooler 15. On the other hand, when the PF controller 51 and the EC controller 52 determine that the trigger signal TG in the ON state is input (Yes in Step S2), the controllers stop driving the pump 35 and the fan 45 (Step S3). Even at that time, the EC controller 52 continues driving the electronic cooler 15. The PF controller 51 stops driving the pump 35 and the fan 45 by setting the duty cycles of the drive signals SG1 and SG2 to 0% at the timing of shifting from the standby period Tt to the detection period Tk. Hence, in the detection period Tk, the drive of the pump 35 and the fan 45 is stopped.

Next, the PF controller 51 acquires the signal H1 and performs PID control on drive of the electronic cooler 15 based on the signal H1 (Step S4). Specifically, the EC controller 52 monitors the temperature of the light detector 10 in response to the signal H1 from the first sensor 60 and performs feedback control on the duty cycle of the drive signal SG3 so that the temperature of the light detector 10 becomes equal to or lower than the temperature HL.

Next, the PF controller 51 determines whether or not the signal H2 indicates a temperature equal to or lower than a predetermined temperature (Step S5). Specifically, the PF controller 51 determines whether the signal H2 indicates that the temperature of the heat exchanger 20 does not exceed the temperature HE as a result of the PID control of the electronic cooler 15 in Step S4. In a case where the PF controller 51 determines that the signal H2 does not indicate a temperature equal to or lower than the predetermined temperature (No in Step S5), the process proceeds to Step 7, and in a case where the PF controller 51 determines that the signal H2 indicates a temperature equal to or lower than the predetermined temperature (Yes in Step S5), the process proceeds to Step S6. Next, the PF controller 51 and the EC controller 52 determine whether or not the trigger signal TG in the OFF state is input (Step S6). Specifically, the PF controller 51 and the EC controller 52 determine whether or not the light detector 10 ends the light detection (that is, whether or not the process has been executed from the detection period Tk to the standby period Tt) by determining whether or not the trigger signal TG has been switched from the ON state to the OFF state. When the PF controller 51 and the EC controller 52 determine that the trigger signal TG in the OFF state is not input (No in Step S6), the controllers continuously acquire the signal H1. Accordingly, the EC controller 52 performs PID control on drive of the electronic cooler 15 based on the signal H1 (Step S4). On the other hand, when the PF controller 51 and the EC controller 52 determine that the trigger signal TG in the OFF state is input (Yes in Step S6), the controllers restart the drive of the pump 35 and the fan 45 (Step S7). At that time, the EC controller 52 continues driving the electronic cooler 15.

Operations and Effects

Functions and effects obtained by the light detecting device 1 and the method for controlling the light detecting device 1 according to the embodiments described above will be described. In the embodiments, the coolant R delivered by the pump 35 and reaching the heat exchanger 20 exchanges heat with the light detector 10 via the heat exchanger 20 to cool the light detector 10. Here, during the detection period Tk, the drive power 1 of the pump 35 is set to 0. Therefore, during the detection period Tk, the operation of the pump 35 at the time of delivering the coolant R is stopped. Accordingly, vibration caused by the pulsation that may occur in the flow of the coolant R is also stopped. Further, since the drive power 4 of the fan 45 is also set to 0 during the detection period Tk, the mechanical vibration of the fan 45 itself is also stopped. That is, the vibration transmitted to the light detector 10 during the detection period Tk is smaller than the vibration transmitted to the light detector 10 during the standby period Tt. As an example illustrating the influence of vibration, a vibration value VL in FIG. 4 indicates a vibration value transmitted to the light detector 10. As illustrated by the vibration value VL in FIG. 4, it can be found that the vibration value VL is substantially zero during the detection period Tk. Consequently, it is possible to suppress deterioration in detection accuracy of the light detecting device 1 due to transmission of vibration.

Further, as described above, the magnitude of the heat capacity of the coolant R itself can be used by using the coolant R. Therefore, even if the drive power 1 of the pump 35 and the drive power 4 of the fan 45 are set to 0 during the detection period Tk, the heat from the heat exchanger 20 can be absorbed using the heat capacity of the coolant R itself. Therefore, it is possible to maintain the cooling effect of the light detector 10 by the coolant R even during the detection period Tk, and it is possible to suppress deterioration in detection accuracy of the light detecting device 1 due to an increase in temperature of the light detector 10.

As in the embodiment, the light detecting device 1 may include the electronic cooler 15. In this case, since the light detector 10 can be efficiently cooled by the electronic cooler 15, the increase in temperature of the light detector 10 can be more reliably suppressed. Further, since the temperature of the light detector 10 can be lowered to a temperature lower than the temperature of the coolant R by the electronic cooler 15 that actively performs cooling, the dark current value of the light detector 10 can be further reduced. As a result, since the detection accuracy of the light detector 10 can be improved, it is possible to suppress deterioration in detection accuracy of the light detecting device 1.

As in the embodiment, the EC controller 52 may continuously drive the electronic cooler 15 during the detection period Tk. In this case, during the detection period Tk, the light detector 10 can be continuously cooled by driving the electronic cooler 15. On the other hand, the heat transferred to the heat exchanger 20 by the driving of the electronic cooler 15 dissipates to the coolant R. However, as described above, since the magnitude of the heat capacity of the coolant R itself can be used, the cooling effect of the light detector 10 by the coolant R can be maintained. Hence, according to the configuration described above, it is possible to more reliably suppress the increase in temperature of the light detector 10 while suppressing the transmission of the vibration derived from the pulsation by cooling the light detector 10 by the electronic cooler 15 and the coolant R. As a result, it is possible to more reliably suppress deterioration in detection accuracy of the light detecting device 1.

As in the embodiment, the EC controller 52 may set the drive power 3 of the electronic cooler 15 so that the temperature of the light detector 10 becomes equal to or lower than the temperature HL during the detection period Tk. In this case, it is possible to suppress an undesired increase in temperature in the light detecting device 1 by detecting the temperature of the light detector 10 and accordingly supplying the drive power 3.

As in the embodiment, the EC controller 52 may perform control such that the drive power 3 at the time t1 is larger than the drive power 3 at the time t2 before the time t1 during the detection period Tk. During the detection period Tk, when the drive power 1 of the pump 35 and the drive power 4 of the fan 45 are set to 0, the temperature of the light detector 10 may gradually increase. In this respect, the cooling effect of the light detector 10 by the electronic cooler 15 at the time t1 after the time t2 can be enhanced as time elapses by controlling the third drive power signal to be large at the time t2 before the time t1. Consequently, it is possible to suppress a situation in which the temperature of the light detector 10 increases. As a result, it is possible to more reliably suppress deterioration in detection accuracy of the light detecting device 1 due to an increase in temperature of the light detector 10.

As in the embodiment, the fan 45 may blow air toward the radiator 40. In this case, heat dissipation of the coolant R is performed by the radiator 40 and the fan 45 so that the cooling effect of the light detector 10 by the coolant R can be further enhanced.

As in the embodiment, the PF controller 51 may restart driving the pump 35 and the fan 45 when the temperature of the heat exchanger 20 exceeds the temperature HE during the detection period Tk. The heat exchanger 20 is particularly likely to have a high temperature because the heat of the light detector 10 dissipates. In this respect, when the temperature of the heat exchanger 20 becomes so high as to exceed the temperature HE, it is possible to suppress a situation in which the heat exchanger 20 becomes too high in temperature by restarting the driving of the pump 35 and the fan 45. As a result, it is possible to improve safety when the light detecting device 1 is used.

In the embodiment, the PF controller 51 drives the pump 35 and the fan 45 when the temperature of the heat exchanger 20 exceeds the temperature HE. However, the PF controller 51 may drive the pump 35 and the fan 45 when the temperature of the light detector 10 exceeds the temperature HE. In this case, when the temperature of the light detector 10 becomes high, the coolant R can cool the light detector 10 by driving the pump 35 and the fan 45.

The light detecting device and the method for controlling the light detecting device of the present disclosure are not limited to the above-described embodiments. In the light detecting device and the method for controlling the light detecting device of the present disclosure, specific aspects may be appropriately changed without departing from the gist of CLAIMS.

First Modification Example

Figure 6:
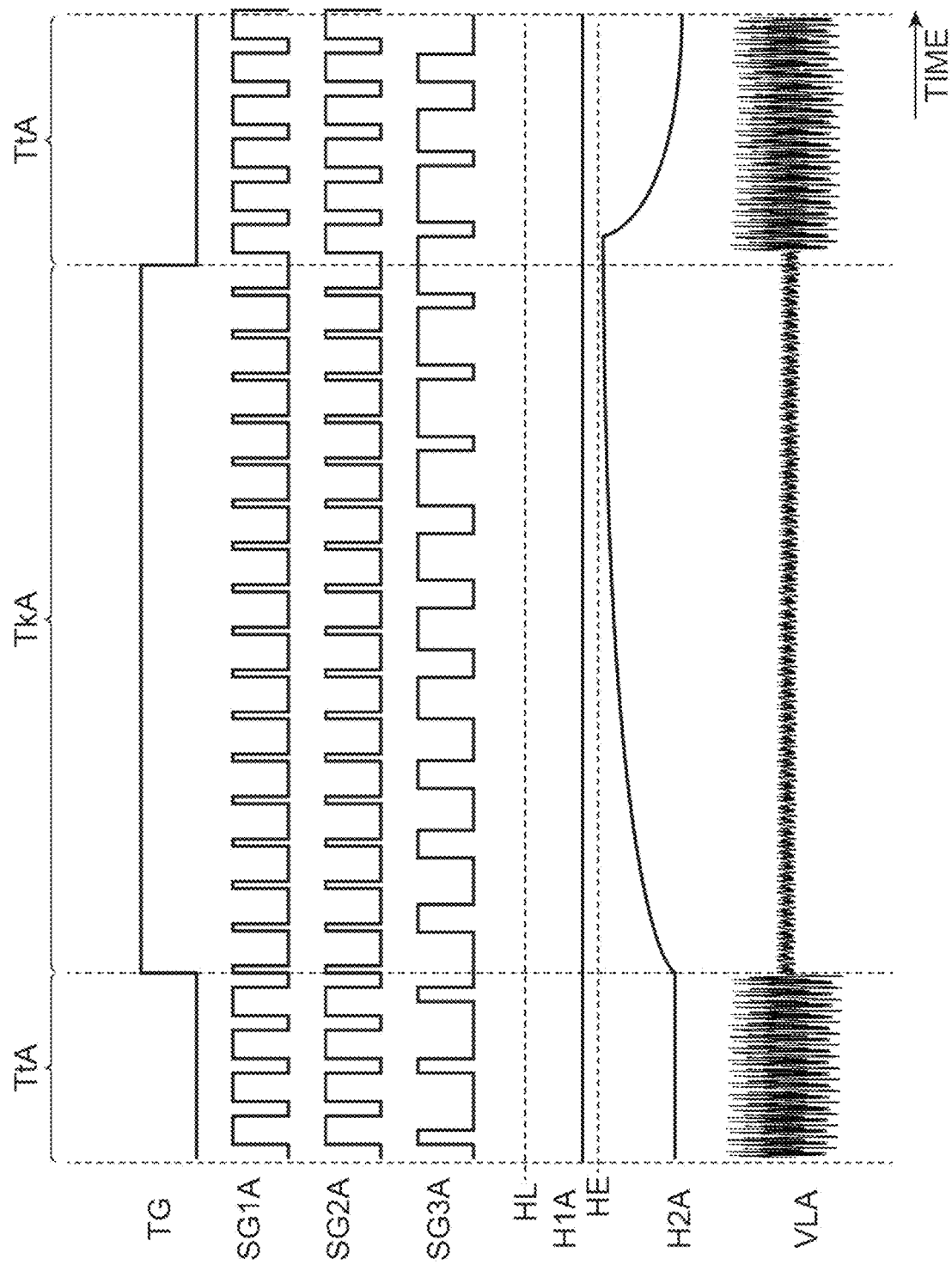
FIG. 6 is a timing chart illustrating a first modification example of each signal processed by the control unit.

FIG. 6 is a timing chart illustrating a first modification example of each signal processed by the control unit 50. In the embodiment described above, a case where the drive of the pump 35 and the fan 45 is stopped during the detection period Tk has been described. However, in the modification example, a case where the drive of the pump 35 and the fan 45 is continued during a detection period TkA will be described.

In the modification example, as illustrated in FIG. 6, when the PF controller 51 adjusts a duty cycle (that is, the drive power of the pump 35) of a drive signal SG1A for controlling the drive of the pump 35, the PF controller 51 controls the duty cycle of the drive signal SG1A during the detection period TkA to be larger than 0% and smaller than the duty cycle of the drive signal SG1A during a standby period TtA. That is, the PF controller 51 controls the drive power 1 (first drive power) of the pump 35 during the detection period TkA to be within a range of the drive power larger than 0 and smaller than the drive power 2 (second drive power) of the pump 35 during the standby period TtA. For example, the PF controller 51 may set the duty cycle of the drive signal SG1A during the detection period TkA to be within a range of the duty cycle larger than 0% and equal to or smaller than 20% of the duty cycle of the drive signal SG1A during the standby period TtA.

In the example illustrated in FIG. 6, the PF controller 51 sets the duty cycle of the drive signal SG1A during the standby period TtA to 67% and sets the duty cycle of the drive signal SG1A during the detection period TkA to 17%. In this case, during the detection period TkA, the pump 35 is driven with the drive power 1 corresponding to 17% of the duty cycle of the drive signal SG1A. As described above, the drive power 1 of the pump 35 during the detection period TkA is significantly reduced as compared with the drive power 2 of the pump 35 during the standby period TtA.

Similarly, when the PF controller 51 adjusts the duty cycle (that is, the drive power of the fan 45) of a drive signal SG2A for controlling the drive of the fan 45, the PF controller 51 controls the duty cycle of the drive signal SG2A during the detection period TkA to be within a range of the duty cycle larger than 0% and smaller than the duty cycle of the drive signal SG2A during a standby period TtA. For example, the PF controller 51 may set the duty cycle of the drive signal SG2A during the detection period TkA to be within a range of the duty cycle larger than 0% and equal to or smaller than 20% of the duty cycle of the drive signal SG2A during the standby period TtA.

When the PF controller 51 adjusts the duty cycle (that is, the drive power of the fan 45) of the drive signal SG2A for controlling the drive of the fan 45, the PF controller 51 controls the duty cycle of the drive signal SG2A during the detection period TkA to be within a range of the duty cycle larger than 0% and smaller than the duty cycle of the drive signal SG2A during a standby period TtA. That is, the PF controller 51 controls the drive power 4 (fourth drive power) of the fan 45 during the detection period TkA to be in a range of the drive power larger than 0 and smaller than the drive power 5 (fifth drive power) of the fan 45 during the standby period TtA. As illustrated in the example of FIG. 6, similarly to the drive signal SG1A, the PF controller 51 performs control such that the duty cycle of the drive signal SG2A during the standby period TtA to 67% and sets the duty cycle of the drive signal SG2A during the detection period TkA to 17%. In this case, during the detection period TkA, the fan 45 is driven with the drive power 4 corresponding to 17% of the duty cycle of the drive signal SG2A. As described above, the drive power 4 of the fan 45 during the detection period TkA is more significantly reduced than the drive power 5 of the fan 45 during the standby period TtA.

Hence, during the detection period TkA, both the pump 35 and the fan 45 continue to be driven with a drive power smaller than the drive power during the standby period TtA. As described above, when the drive of the pump 35 and the fan 45 is continued during the detection period TkA, the heat dissipation effect with respect to the coolant R is enhanced as compared with the case where the drive of the pump 35 and the fan 45 is stopped as in the embodiment described above, and thus, the cooling effect of the light detector 10 by the coolant R is enhanced. Therefore, the temperature of the light detector 10 is less likely to increase during the detection period TkA. Accordingly, when the duty cycle (that is, the drive power of the electronic cooler 15) of a drive signal SG3A for driving the electronic cooler 15 is controlled, an increase width of the duty cycle of the drive signal SG3A during the detection period TkA decreases more than an increase width (see FIG. 4) of the duty cycle of the drive signal SG3 during the detection period Tk according to the embodiment described above.

That is, during the detection period TkA, the temperature of the light detector 10 can be maintained constant in a range of the temperature HL or less as illustrated in a signal H1A of FIG. 6 without a rapidly increase in drive power of the electronic cooler 15. Further, as illustrated by a signal H2A in FIG. 6, during the detection period TkA, the temperature of the heat exchanger 20 increases more slowly. That is, during the detection period TkA, as compared with an increase in temperature of the heat exchanger 20 during the detection period Tk according to the embodiment described above (see the signal H2 in FIG. 4), it takes a longer time until the temperature of the heat exchanger 20 reaches a certain temperature. As described above, since the temperatures of the light detector 10 and the heat exchanger 20 hardly increase during the detection period TkA, it is possible to secure a longer time until the light detector 10 and the heat exchanger 20 reach the respective temperatures HL and HE. As a result, a longer detection period TkA can be secured than the detection period Tk according to the embodiment described above.

In the modification example, since the pump 35 and the fan 45 continue to be driven during the detection period TkA, it is possible to suppress a situation in which the heat dissipation effect with respect to the coolant R decreases. That is, it is possible to suppress a situation in which the cooling effect of the light detector 10 by the coolant R is reduced. As a result, it is possible to more reliably suppress the increase in temperature of the light detector 10 and accordingly the increase in dark current, and thus it is possible to more reliably suppress deterioration in detection accuracy of the light detecting device 1 due to the increase in dark current. Further, since the pump 35 and the fan 45 during the detection period TkA are driven with the drive power significantly reduced as compared with that during the standby period TtA, the vibration caused by the drive of the pump 35 and the fan 45 is also significantly reduced accordingly. As illustrated by a vibration value VLA in FIG. 6, it can be found that the vibration value VLA is significantly smaller during the detection period TkA than during the standby period TtA. Hence, the influence of the vibration caused by the drive of the pump 35 and the fan 45 on the detection accuracy of the light detecting device 1 can be reduced. That is, it is possible to suppress deterioration in detection accuracy of the light detecting device 1 due to transmission of the vibration. Further, in the modification example, as described above, the temperatures of the light detector 10 and the heat exchanger 20 are less likely to increase so that a long detection period TkA can be secured. That is, the light detection of the light detector 10 can be performed over a longer period.

Second Modification Example

Figure 7:
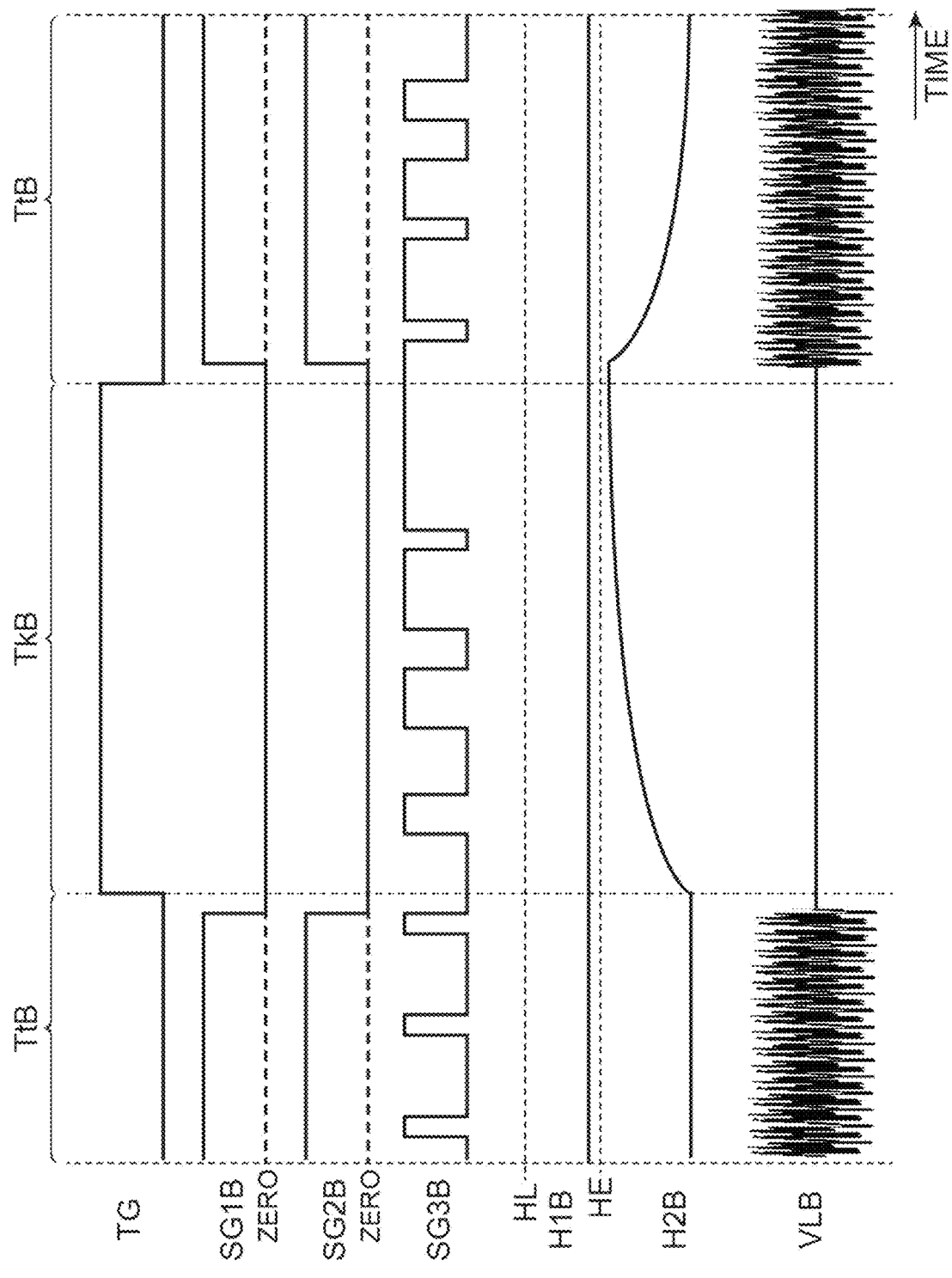
FIG. 7 is a timing chart illustrating a second modification example of each signal processed by the control unit.

FIG. 7 is a timing chart illustrating a second modification example of each signal processed by the control unit 50. In the embodiment described above, a case where the drive of the pump 35 and the fan 45 is controlled by the PWM control, and the drive of the pump 35 and the fan 45 is stopped during the detection period Tk has been described. However, in the modification example, a case where the drive of the pump 35 and the fan 45 is controlled by constant voltage control (linear control), and the pump 35 and the fan 45 are stopped during a detection period TkB will be described.

In the modification example, the PF controller 51 controls the supply of the drive power so that a voltage supplied to the pump 35 becomes constant. Similarly, the PF controller 51 controls the supply of the drive power so that the voltage supplied to the fan 45 becomes constant. The PF controller 51 adjusts a drive voltage of the pump 35 in response to a drive signal SG1B. The PF controller 51 controls the drive signal SG1B to maintain a drive voltage 2 (second drive power) of the pump 35 to be constant (for example, 12 V) during a standby period TtB and maintain a drive voltage 1 (first drive power) of the pump 35 at 0 during the detection period TkB. The PF controller 51 adjusts the drive voltage of the fan 45 in response to the drive signal SG2B. Similarly to the drive signal SG1B, the PF controller 51 controls a drive signal SG2B to maintain a drive voltage 5 (fifth drive power) of the fan 45 to be constant (for example, 12 V) during the standby period TtB and maintain a drive voltage 4 (fourth drive power) of the fan 45 at 0 during the detection period TkB.

Hence, in the modification example, similarly to the embodiment described above, the drive of both the pump 35 and the fan 45 is stopped during the detection period TkB. Further, in the modification example, similarly to the embodiment described above, the EC controller 52 performs control to drive the electronic cooler 15 by the PWM control during the detection period TkB. Accordingly, the EC controller 52 performs the feedback control on the duty cycle of a drive signal SG3B so that the temperature of the light detector 10 becomes equal to or lower than the temperature HL. As a result, during the detection period TkB, the drive power of the electronic cooler 15 is controlled to increase as time elapses. The EC controller 52 can maintain the temperature of the light detector 10 constant within a range of the temperature HL or less as illustrated by a signal HIB in FIG. 7 by performing the feedback control on the electronic cooler 15. On the other hand, as illustrated by a signal H2B in FIG. 7, during the detection period TkB, the temperature of the heat exchanger 20 increases in a range in which the temperature does not exceed the temperature HE as time elapses.

Also in the modification example, since the drive of the pump 35 and the fan 45 is stopped during the detection period TkB, it can be found that a vibration value VLB is substantially 0 during the detection period TkB as illustrated by the vibration value VLB of FIG. 7. Hence, also in the modification example, similarly to the embodiment described above, it is possible to suppress deterioration in detection accuracy of the light detecting device 1 due to transmission of vibration.

Third Modification Example

Figure 8:
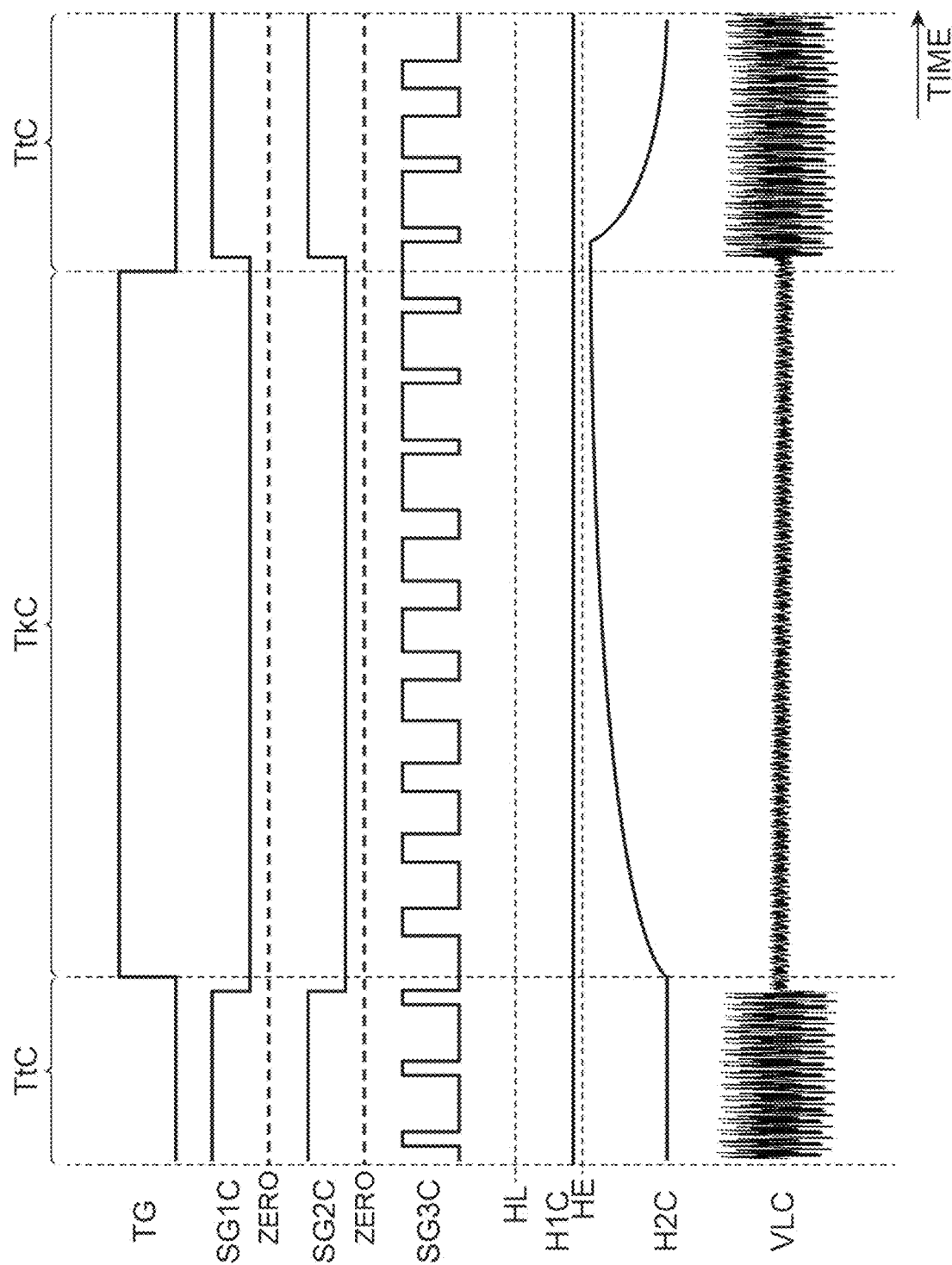
FIG. 8 is a timing chart illustrating a third modification example of each signal processed by the control unit.

FIG. 8 is a timing chart illustrating a third modification example of each signal processed by the control unit 50. In the embodiment described above, a case where the drive of the pump 35 and the fan 45 is controlled by the PWM control, and the drive of the pump 35 and the fan 45 is stopped during the detection period Tk has been described. However, in the modification example, a case where the drive of the pump 35 and the fan 45 is controlled by the constant voltage control (linear control), and the drive of the pump 35 and the fan 45 is continued during a detection period TkC will be described.

In the modification example, the PF controller 51 controls the supply of the drive power so that a voltage supplied to the pump 35 becomes constant. Similarly, the PF controller 51 controls the supply of the drive power so that the voltage supplied to the fan 45 becomes constant. The PF controller 51 adjusts a drive voltage of the pump 35 in response to a drive signal SG1C. The PF controller 51 controls the drive signal SG1C to maintain the drive voltage 2 (second drive power) of the pump 35 constant (for example, 12 V) during a standby period TtC and maintain the drive voltage 1 (first drive power) of the pump 35 during the detection period TkC at a voltage (for example, 5 V) larger than 0 and smaller than the constant voltage. The PF controller 51 adjusts the drive voltage of the fan 45 in response to the drive signal SG2C. Similarly to the drive signal SG1C, the PF controller 51 controls the drive signal SG2C to maintain the drive voltage 5 (fifth drive power) of the fan 45 at a constant voltage (for example, 12 V) during the standby period TtC and maintain the drive voltage 4 (fourth drive power) of the fan 45 during the detection period TkC at a voltage (for example, 5 V) larger than 0 and smaller than the constant voltage.

Hence, in the modification example, during the detection period TkC, the drive voltages of the pump 35 and the fan 45 are significantly reduced as compared with the standby period TtC. Accordingly, similarly to the first modification example described above, since the temperature of the light detector 10 is less likely to increase during the detection period TkC, an increase width of a duty cycle of a drive signal SG3C during the detection period TkC is smaller than an increase width (see FIG. 4) of the duty cycle of the drive signal SG3 during the detection period Tk according to the embodiment described above. That is, during the detection period TkC, even when a drive voltage 3 (third drive power) of the electronic cooler 15 is not rapidly increased, the temperature of the light detector 10 can be maintained constant within a range of the temperature HL or less as illustrated by a signal HIC of FIG. 8.

Further, as illustrated by a signal H2C in FIG. 8, during the detection period TkC, the temperature of the heat exchanger 20 increases more slowly. That is, during the detection period TkC, as compared with an increase in temperature of the heat exchanger 20 during the detection period Tk according to the embodiment described above (see the signal H2 in FIG. 4), it takes a longer time until the temperature of the heat exchanger 20 reaches a certain temperature. As described above, since the temperatures of the light detector 10 and the heat exchanger 20 hardly increase during the detection period TkC, it is possible to secure a longer time until the light detector 10 and the heat exchanger 20 reach the respective temperatures HL and HE. As a result, a longer detection period TkC can be secured than the detection period Tk according to the embodiment described above.

In the modification example, since the pump 35 and the fan 45 continue to be driven during the detection period TkC, it is possible to obtain the same effect as that of the first modification example described above. That is, it is possible to more reliably suppress the increase in temperature of the light detector 10 and accordingly the increase in dark current, and thus it is possible to more reliably suppress deterioration in detection accuracy of the light detecting device 1 due to the increase in dark current. Further, since the pump 35 and the fan 45 during the detection period TkC are driven with the drive voltage significantly reduced as compared with that during the standby period TtC, the vibration caused by the drive of the pump 35 and the fan 45 is also significantly reduced accordingly. As illustrated by a vibration value VLC in FIG. 8, it can be found that the vibration value VLC is significantly smaller during the detection period TkC than during the standby period TtC. Consequently, the influence of the vibration caused by the drive of the pump 35 and the fan 45 on the detection accuracy of the light detecting device 1 can be reduced. That is, it is possible to suppress deterioration in detection accuracy of the light detecting device 1 due to transmission of the vibration. Further, in the modification example, as described above, the temperatures of the light detector 10 and the heat exchanger 20 increase more slowly so that a long detection period TkC can be secured. That is, the light detection of the light detector 10 can be performed over a longer period.

Fourth Modification Example

Figure 9:
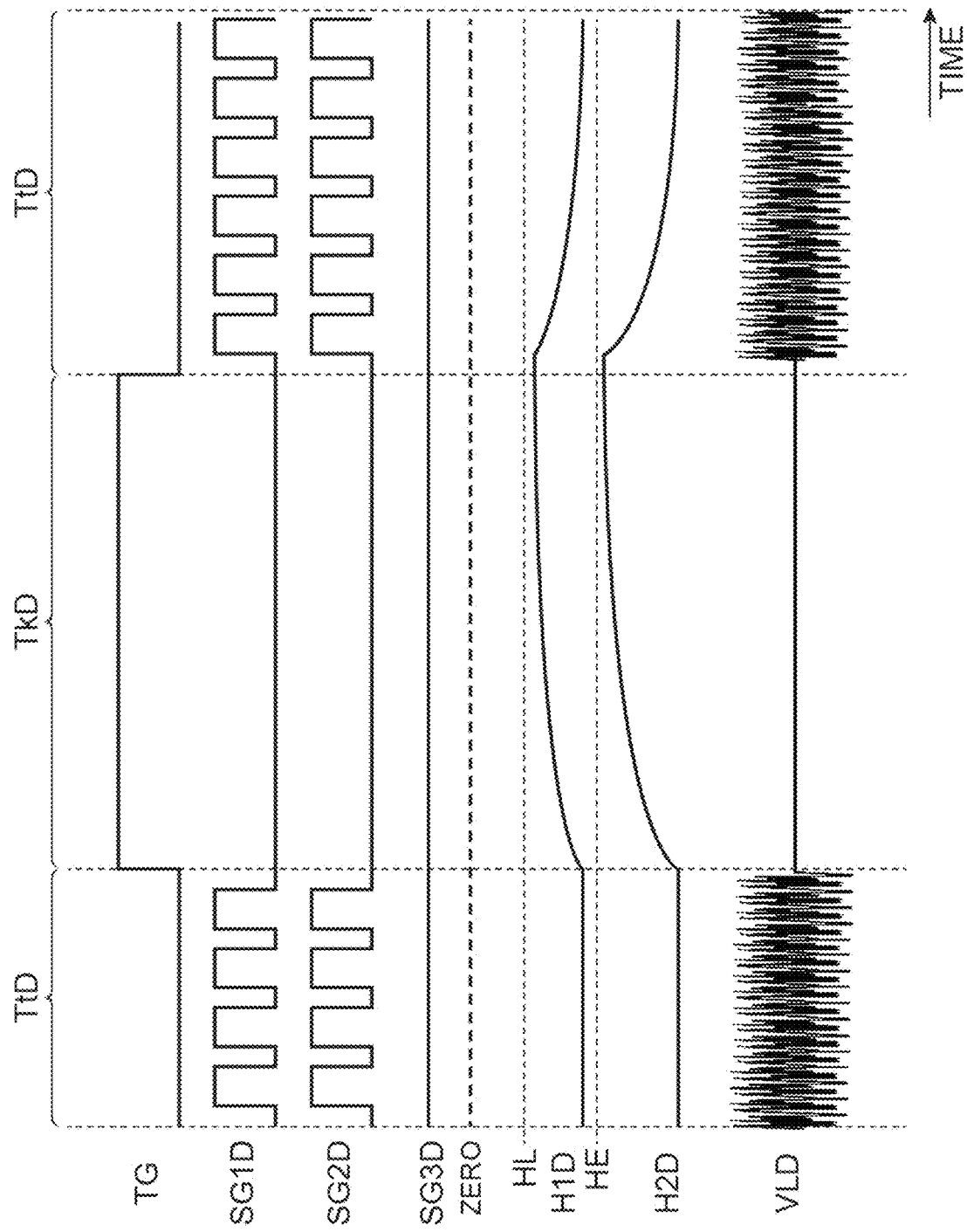
FIG. 9 is a timing chart illustrating a fourth modification example of each signal processed by the control unit.

FIG. 9 is a timing chart illustrating a fourth modification example of each signal processed by the control unit 50 of the light detecting device 1. In the embodiment described above, the case where the drive of the electronic cooler 15 is controlled by the PWM control has been described. On the other hand, as in the modification example, the drive of the electronic cooler 15 may be controlled by constant current control (linear control) (drive signal SG3D).

The light detecting device and the method for controlling the light detecting device of the present disclosure are not limited to the embodiments and the modification examples described above and can be modified in various other manners. For example, the embodiments and the modification examples described above may be combined with each other according to a necessary purpose and effect. In the embodiments and the modification examples described above, the case where the waveform of the drive signal for controlling the drive of the pump and the waveform of the drive signal for controlling the drive of the fan are the same has been described. However, the waveforms of these drive signals may be different from each other.

In the embodiments, the second modification example, and the fourth modification example described above, there is no need to stop driving of both the pump and the fan during the detection period, only the drive of the pump may be stopped, and the drive of the fan may be continued. In the first modification example and the third modification example described above, there is no need to significantly reduce the drive power of both the pump and the fan during the detection period, and only the drive power of the pump may be significantly reduced without reducing the drive power of the fan. In this case, the fan may be normally driven. Since the fan is disposed at a position separated from the light detector, the vibration of the fan is hardly transmitted to the light detector even when the fan is normally driven, and the influence of the vibration of the fan on the detection accuracy of the light detecting device may be small. Therefore, in the embodiment and the modification examples described above, the case where the drive power supplied to the fan during the detection period is smaller than the drive power supplied to the fan during the standby period has been described. However, when the fan is disposed to be sufficiently separated from the light detector, the drive power supplied to the fan during the detection period may be set to be larger than the drive power supplied to the fan during the standby period. As a result, the heat dissipation efficiency of the coolant in the coolant flow channel can be enhanced, and deterioration in detection accuracy of the light detecting device due to an increase in temperature of the light detector can be suppressed.

In the embodiments and the modification examples described above, the case where one control unit controls the drive of the pump, the fan, and the electronic cooler has been described. However, for example, the drive of the electronic cooler may be controlled by another control system such as a temperature controller. That is, the electronic cooler controller that controls the drive of the electronic cooler may be provided in another device separate from the control unit. In this case, a temperature sensor that detects the temperature (that is, the temperature of the light detector) of the heat absorption surface of the electronic cooler may be additionally provided, and the temperature sensor may be configured to output a signal indicating the temperature of the heat absorption surface of the electronic cooler to the other device. In the embodiments and the modification examples described above, the case where the light detecting device does not include a reservoir tank as a cooling mechanism has been described. However, the light detecting device may include the reservoir tank.

REFERENCE SIGNS LIST

1 Light detecting device
10 Light detector
15 Electronic cooler
20 Heat exchanger
35 Pump
40 Radiator
45 Fan
50 Control unit
60 First sensor
65 Second sensor
R Coolant
RP Circulation channel (coolant flow channel)
Tt, TtA, TtB, TtC, TtD Standby period
Tk, TkA, TkB, TkC, TkD Detection period

The invention claimed is:

1. A light detecting device comprising:
a light detector;
a heat exchanger thermally connected to the light detector;
a coolant flow channel configured to be connected to the heat exchanger and allow a coolant for cooling the light detector to flow;
a pump configured to cause the coolant to flow in the coolant flow channel; and
a control unit configured to control the pump, wherein the control unit performs control such that
- a first drive power is supplied to the pump during a detection period in which the light detector performs light detection, and
- a second drive power is supplied to the pump during a standby period in which the light detector stands by without performing light detection, and
- the first drive power is smaller than the second drive power.

2. The light detecting device according to claim 1, wherein the control unit controls to stop supplying the first drive power during the detection period.

3. The light detecting device according to claim 1, wherein the control unit performs control such that the first drive power is larger than zero and smaller than the second drive power during the detection period.

4. The light detecting device according to claim 1, further comprising an electronic cooler thermally connected to the light detector and the heat exchanger.

5. The light detecting device according to claim 4, wherein the control unit performs control such that a third drive power is supplied to the electronic cooler during the detection period.

6. The light detecting device according to claim 5, wherein the control unit performs control such that the third drive power at a time t1 is larger than the third drive power at a time t2 before the time t1 during the detection period.

7. The light detecting device according to claim 4, further comprising at least a first sensor configured to detect a temperature of the light detector, wherein
the control unit controls supply of the third drive power to the electronic cooler such that the temperature detected by the first sensor is equal to or lower than a first allowable temperature during the detection period.

8. The light detecting device according to claim 1, further comprising at least one of a first sensor configured to detect a temperature of the light detector and a second sensor configured to detect a temperature of the heat exchanger.

9. The light detecting device according to claim 8, further comprising at least a second sensor configured to detect a temperature of the heat exchanger, wherein
the control unit performs control such that
a sixth drive power is supplied to the pump and the sixth drive power is larger than the first drive power in a case where the temperature detected by the second sensor exceeds a second allowable temperature during the detection period.

10. The light detecting device according to claim 1, further comprising a fan configured to blow air toward the coolant flow channel, wherein
the control unit performs control such that
- a fourth drive power is supplied to the fan during the detection period, and
- a fifth drive power is supplied to the fan during the standby period, and
- the fourth drive power is smaller or larger than the fifth drive power.

11. The light detecting device according to claim 10, wherein the coolant flow channel further includes a radiator configured to release heat of the coolant, and
the fan blows air toward the radiator.

12. A method for controlling a light detecting device including a light detector, a heat exchanger thermally connected to the light detector, a coolant flow channel configured to be connected to the heat exchanger and allow a coolant for cooling the light detector to flow, and a pump configured to cause the coolant to flow in the coolant flow channel, the method comprising:
- supplying a first drive power to the pump during a detection period in which the light detector performs light detection; and
- supplying a second drive power to the pump during a standby period in which the light detector stands by without performing light detection, wherein
the first drive power is smaller than the second drive power.

* * * * *